United States Patent

Yatsuyanagi et al.

(10) Patent No.: US 6,518,367 B1
(45) Date of Patent: Feb. 11, 2003

(54) RUBBER COMPOSITION

(75) Inventors: Fumito Yatsuyanagi, Hiratsuka (JP); Kazunori Ishikawa, Hiratsuka (JP); Shuichi Fukutani, Onomichi (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/504,792

(22) Filed: Feb. 15, 2000

(30) Foreign Application Priority Data

| Feb. 25, 1999 | (JP) | 11-048084 |
| May 17, 1999 | (JP) | 11-135649 |
| May 17, 1999 | (JP) | 11-135710 |
| Jun. 7, 1999 | (JP) | 11-160038 |
| Aug. 12, 1999 | (JP) | 11-228715 |
| Aug. 13, 1999 | (JP) | 11-229228 |
| Aug. 13, 1999 | (JP) | 11-229260 |
| Jan. 13, 2000 | (JP) | 2000-010049 |

(51) Int. Cl.$^7$ .......................... C08C 19/20
(52) U.S. Cl. .............. 525/332.6; 525/331.8; 525/343
(58) Field of Search .............. 525/332.6, 331.8, 525/332.7, 330.9

(56) References Cited

U.S. PATENT DOCUMENTS

| 3,083,232 A | * | 3/1963 | Lissant | 528/380 |
| 3,324,051 A | * | 6/1967 | Lal | 528/380 |
| 3,351,571 A | * | 11/1967 | Grace | 527/380 |
| 5,780,531 A | * | 7/1998 | Scholl | 525/343 |

FOREIGN PATENT DOCUMENTS

| CA | 0683736 | * | 4/1964 |
| GB | 1144634 | * | 3/1969 |

* cited by examiner

Primary Examiner—Christopher Henderson
(74) Attorney, Agent, or Firm—Arent Fox Kintner Plotkin & Kahn PLLC

(57) ABSTRACT

A rubber composition comprising a vulcanizable rubber, a reinforcing filler, a softening agent, and other reagents for rubber to which is added in a specific amount of a sulfur compound having the formula (I):

$$-(S_xR^1)_n-  \qquad (I)$$

wherein $R^1$ represents an organic group, x is a number of 3 to 5 on average, and n is an integer of 1 to 100, or a specific sulfur compound (1) and sulfur (2), and optionally a thiazole base, sulfenamide base, thiuram base, and/or diothio acid base vulcanization accelerator (3).

11 Claims, No Drawings

RUBBER COMPOSITION

BACKGROUND OF THE INVENTION

1. Field of the Invention

The present invention relates to a vulcanized rubber composition, more particularly relates to a vulcanized rubber composition balanced in heat aging characteristics, fatigue resistance, and heat buildup property by using a sulfur compound having a specific structure and optionally sulfur, to control the sulfur cross-linking structure of the rubber.

The present invention also relates to a rubber composition for a heavy duty tire tread, more particularly relates to a rubber composition for a heavy duty tire tread in which a diene rubber is compounded with a reinforcing filler, rosin base and/or cyclopentadiene base resin, sulfur compound having a specific tetrasulfide or benzothiazole structure so as to improve the abrasion resistance, heat aging characteristics, and appearance after use while maintaining the heat buildup property of the tire and the cut resistance when new.

2. Description of the Related Art

In the past, mainly sulfur has been used as a vulcanization agent for vulcanization of rubber, but rubber compositions comprising blends of rubber compositions with polysulfide polymers are known. For example, Japanese Unexamined Patent Publication (Kokai) No. 10-120788 describes a polysulfide polymer used as a rubber vulcanization agent, .Japanese Unexamined Patent Publication (Kokai) No. 10-139939 describes a cross-linkable rubber composition containing a polysulfide rubber, and Japanese Unexamined Patent Publication (Kokai) No. 10-251514 also describes a rubber composition containing a polysulfide polymer. Further, Japanese Unexamined Patent Publication (Kokai) No. 62-48739 describes a high grip tread rubber composition suitable for high speed driving.

The sulfur cross-linking structures of rubber are roughly classified into monosulfide bridges, disulfide bridges, and polysulfide bridges, but in general it is said that the greater the monosulfide bridges in vulcanized rubber, the better the heat aging characteristics become. If there are many monosulfide bridges, however, there is the problem that the strength and elongation at break and the fatigue failure characteristics fall. On the other hand, if there are many polysulfide bridges in the vulcanized rubber, while the strength and elongation at break and the fatigue failure characteristics are superior, there is the problem that the heat aging characteristics fall.

In addition, a general diene-base rubber suffers from the phenomenon of reversion where the various physical properties fall upon high temperature vulcanization in the case of a sulfur/vulcanization accelerator vulcanization system. Improvement of this is sought. To improve this, it is desirable to add a polysulfide polymer having 2 to 5 sulfur atoms, but there is the problem that if this is not suitably blended in, it causes a remarkable change in other physical properties and in particular causes a deterioration of the heat buildup property.

Furthermore, in heavy duty tires such as tires for construction machinery which are used on bad roads and under heavy duty conditions, improvement in the heat buildup property, the abrasion resistance, and other properties is sought. At the same time, in recent years, there have been rising demands for prevention of a decline in physical properties due to use and securing a good appearance due to the same. In order to meet these demands, for example, Japanese Unexamined Patent Publication (Kokai) No. 10-219034 proposes a specific ratio of formulation of specific carbon black and silica. Further, from the same viewpoint as the present invention, in the sense of prevention of heat degradation, it has been proposed to use a sulfur compound such as polyalkylene tetrasulfide (condensed product of sodium tetrasulfide and an alkylene dihalide) in order to obtain a thermally stable cross-linking state (see 1967 Synthetic Rubber Handbook (enlarged new edition), p. 309), but control of the molecular weight for securing the compatibility with rubber and handling is difficult and this is not preferred from the viewpoints of scorch resistance and safety.

SUMMARY OF THE INVENTION

Therefore, an object of the present invention is to provide a vulcanized rubber composition balanced in heat aging characteristics, fatigue resistance, and heat buildup property.

Another object of the present invention is to provide a vulcanized rubber composition improved in reversion resistance without changing the other physical properties.

A further object of the present invention is to provide a rubber composition for a heavy duty tire tread which enables improvement of the abrasion resistance, heat aging characteristics, and appearance after use while maintaining the heat buildup property, cut resistance when new, and other properties.

Other objects and advantages of the present invention will be apparent from the following description.

In accordance with the first aspect of the present invention, there is provided a vulcanized rubber composition comprising a vulcanizable rubber, a reinforcing filler, and a sulfur compound (1) having the formula (I):

$$-(S_x R^1)_n- \qquad (I)$$

wherein $R^1$ represents an organic group, x is an average number of 3 to 5, and n is an integer of 1 to 100, wherein a ratio (VM/VD) is not more than 0.4, in which:

a value VM is obtained from the degree of change before and after toluene swelling of the vulcanized rubber composition treated in a lithium aluminum hydride saturated tetrahydrofuran/toluene (ratio by volume 1/1) mixed solution using the formula (A):

$$VM = -\frac{1}{V_S} \cdot \left[ \frac{\ln(1-vr_M) + vr_M + \mu \cdot vr_M^2}{vr_M^{1/3} - vr_M/2} \right] \qquad (A)$$

wherein $vr_M = \dfrac{1-\phi}{X_M - \phi}$ wherein $X_M$ is the degree of change.before and after toluene swelling (volume after toluene swelling/volume before toluene swelling)after treatment in a lithium aluminum hydride saturated tetrahydrofuran/toluene (ratio by volume 1/1) mixed solution, φ is the volume percentage of the reinforcing filler in the rubber composition, $V_s$ is the molecular volume of toluene, μ is the rubber.toluene interaction coefficient, and $vr_M$ is the volume percentage of rubber in the swelled rubber after treatment in a lithium aluminum hydride saturated tetrahydrofuran/toluene (ratio by volume 1/1) mixed solution and a value VD is obtained from the degree of change before and after toluene swelling of the vulcanized rubber composition treated.in a propane-2-thiol (0.4 mol/l)/piperidine (0.4 mol/l) added tetrahydrofuran/toluene (ratio by volume 1/1) mixed solution using the formula (B):

$$VD = -\frac{1}{V_S} \cdot \left[ \frac{\ln(1 - vr_{D+M}) + vr_{D+M} + \mu \cdot vr_{D+M}^2}{vr_{D+M}^{1/3} - vr_{D+M}/2} - \frac{\ln(1 - vr_M) + vr_M + \mu \cdot vr_M^2}{vr_M^{1/3} - vr_M/2} \right] \quad (B)$$

$$\text{wherein } vr_{D+M} = \frac{1 - \phi}{X_{D+M} - \phi}$$

wherein $X_{D+M}$ is the degree of change before and after toluene swelling (volume after toluene swelling/volume before toluene swelling)after treatment in a propane-2-thiol (0.4 mol/l)/piperidine (0.4 mol/l) added tetrahydrofuran/toluene (ratio by volume 1/1) mixed solution and $vr_{D+M}$ is the volume percentage of rubber in the swelled rubber after treatment in a propane-2-thiol (0.4 mol/l)/piperidine (0.4 mol/l) added tetrahydrofuran/toluene (ratio by volume 1/1) mixed solution).

A vulcanized rubber composition according to the preferable embodiment of the first aspect of the present invention further has a ratio (VM/VT) is not more than 0.15, in which:

VT found from the degree of change before and after toluene swelling of the untreated vulcanized rubber composition using formula (C):

$$VT = -\frac{1}{V_S} \cdot \left[ \frac{\ln(1 - vr_T) + vr_T + \mu \cdot vr_T^2}{vr_T^{1/3} - vr_T/2} \right] \quad (C)$$

$$\text{wherein } vr_T = \frac{1 - \phi}{X_T - \phi}$$

where $X_T$ is the degree of change before and after toluene swelling when untreated (volume after toluene swelling/volume before toluene swelling) and $vr_T$ is the volume percentage of rubber in the swelled rubber when untreated and VM is defined above.

In accordance with the second aspect of the present invention, there is also provided a vulcanized rubber composition comprising 100 parts by weight of a vulcanizable rubber, a reinforcing filler, and a sulfur compound (1) having the formula (I):

—$(S_x R^1)_n$— (I)

wherein $R^1$ represents an organic group, x is an average number of 3 to 5, and n is an integer of 1 to 100 in an amount of not more than 20 parts by weight or the sulfur compound (1)
and sulfur (2) in a ratio by weight (1)/(2) of at least 0.5 and in a total weight of (1)+(2) of not more than 20 parts by weight, vulcanized by compounding at least one vulcanization accelerator (3) selected from the group consisting of a thiazole base, sulfenamide base, thiuram base, and diothio acid base accelerator in an amount so as to give a ratio by weight [(1)+(2)]/(3) of not more than 2.2, wherein a value VM is obtained from the degree of change before and after toluene swelling of the vulcanized rubber composition treated in a lithium aluminum hydride saturated tetrahydrofuran/toluene (ratio by volume 1/1) mixed solution using the formula (A):

$$VM = -\frac{1}{V_S} \cdot \left[ \frac{\ln(1 - vr_M) + vr_M + \mu \cdot vr_M^2}{vr_M^{1/3} - vr_M/2} \right] \quad (A)$$

$$\text{wherein } vr_M = \frac{1 - \phi}{X_M - \phi}$$

wherein $X_M$ is the degree of change before and after toluene swelling (volume after toluene swelling/volume before toluene swelling)after treatment in a lithium aluminum hydride saturated tetrahydrofuran/toluene (ratio by volume 1/1) mixed solution, $\phi$ is the volume percentage of the reinforcing filler in the rubber composition, $V_S$ is the molecular volume of toluene, $\mu$ is the rubber.toluene interaction coefficient, and $vr_M$ is the volume percentage of rubber in the swelled rubber after treatment in a lithium aluminum hydride saturated tetrahydrofuran/toluene (ratio by volume 1/1) mixed solution, a value V[D+M] is obtained from the degree of change before and after toluene swelling of the vulcanized rubber composition treated in a propane-2-thiol (0.4 mol/l)/piperidine (0.4 mol/l) added tetrahydrofuran/toluene (ratio by volume 1/1) mixed solution using the formula (D):

$$V[D+M] = -\frac{1}{V_S} \cdot \left[ \frac{\ln(1 - vr_{D+M}) + vr_{D+M} + \mu \cdot vr_{D+M}^2}{vr_{D+M}^{1/3} - vr_{D+M}/2} \right] \quad (D)$$

$$\text{wherein } vr_{D+M} = \frac{1 - \phi}{X_{D+M} - \phi}$$

wherein $X_{D+M}$ is the degree of change before and after toluene swelling (volume after toluene swelling/volume before toluene swelling)after treatment in a propane-2-thiol (0.4 mol/l)/piperidine (0.4 mol/l) added tetrahydrofuran/toluene (ratio by volume 1/1) mixed solution, $\phi$, $V_S$, $\mu$, and $vr_M$ are as defined above, and $vr_{D+M}$ is the volume percentage of rubber in the swelled rubber after treatment in a propane-2-thiol (0.4 mol/l)/piperidine (0.4 mol/l) added tetrahydrofuran/toluene (ratio by volume 1/1) mixed solution), and a value VT is obtained from the degree of change before and after toluene swelling of the untreated vulcanized rubber composition using formula (C):

$$VT = -\frac{1}{V_S} \cdot \left[ \frac{\ln(1 - vr_T) + vr_T + \mu \cdot vr_T^2}{vr_T^{1/3} - vr_T/2} \right] \quad (C)$$

$$\text{wherein } vr_T = \frac{1 - \phi}{X_T - \phi}$$

wherein $X_T$ is the degree of, change before and after toluene swelling when untreated (volume after toluene swelling/volume before toluene swelling) and $vr_T$ is the volume percentage of rubber in the swelled rubber when untreated are such that VM/VT is not more than 0.3 and (VT−V[D+M])/VT is at least 0.4 and further are such that the ratio VM/VD of VD(=V[D+M]−VM) and VM is at least 0.4 and wherein the rate of retention of the tensile strength at break and the elongation at break of the vulcanized rubber composition before (and after heat aging at 100° C. for 96 hours is at least 0.7.

In accordance with the third aspect of the present invention, there is further provided a rubber composition comprising 100 parts by weight of a vulcanizable rubber, a reinforcing filler, and a sulfur compound (1) having the formula (I):

$$-(S_xR^1)_n- \quad (I)$$

wherein $R^1$ represents an organic group, x is an average number of 3 to 5, and n is an integer of 1 to 100 and sulfur (2), in a ratio (1)/(2) of the sulfur compound (1) and the sulfur (2) of less than 0.5 and in a total weight of (1)+(2) of not more than 20 parts by weight.

In accordance with the fourth aspect of the present invention, there is still further provided a rubber composition for a heavy duty tire tread comprising 100 parts by weight of a diene rubber, 40 to 85 parts by weight of a reinforcing filler, 1 to 10 parts by weight of at least one resin selected from the group consisting of a rosin base resin, a cyclopentane diene base resin, and mixtures thereof, a sulfur compound having the formula (I) or (II):

$$-(S_xR^1)_n- \quad (I)$$

wherein $R^1$ indicates an organic group, x is an integer of 3 to 5, and n is an integer of 1 to 100

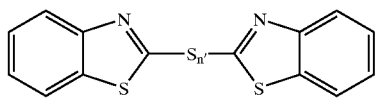

(II)

wherein n' is an integer of 3 or 4 and, in some cases, sulfur or a sulfur donor.

DESCRIPTION OF THE PREFERRED EMBODIMENTS

The present inventors engaged in research to achieve the above object and, as a result, succeeded in obtaining a rubber composition achieving both good heat aging characteristics and failure characteristics by using a sulfur compound having a specific structure to control the sulfur cross-linking structure of the rubber. That is, the present inventors took note of an organic polysulfide polymer having a tetrasulfide structure of four sulfur atoms for achieving both good heat aging characteristics and failure characteristics and discovered that by controlling the cross-linking structure together with this, it is possible to achieve both good heat aging characteristics and failure characteristics and heat generation.

As the cross-linking structure in the first aspect of the present invention, specifically the disulfide bridges are made at least 2.5 times the monosulfide bridges, more preferably the ratio of the monosulfide bridges causing deterioration of the failure characteristics is made not more than 15% of the whole.

Further, in the present invention, since a specific organic polysulfide polymer having a tetrasulfide structure is used, even in the case of a polysulfide bridge of three or more sulfur atoms, while it may have as much as eight ordinary sulfur atoms, the number of sulfur bonds is kept down to not more than 4, and therefore, the heat aging characteristics are improved. Further, the sulfur compound of the present invention can greatly shorten the vulcanization time compared with known polysulfide polymer. As the means for obtaining this cross-linking structure, combination with a vulcanization accelerator is best. It is preferable to compound at least one vulcanization accelerator selected from a sulfenamide base, thiazole base, thiuram base, and dithio acid salt base accelerator to give a ratio by weight with the polysulfide polymer of preferably 0.3 to 4, and more preferably 0.3 to 3 and further to compound, into the above combination of the vulcanization accelerator at least one vulcanization accelerator selected from a guanidine base, aldehyde-ammonia base, aldehyde-amine base, and thiourea base accelerator to 0.1 to 1 part by weight.

As explained above, the vulcanized rubber composition according to the present invention is a rubber composition containing a vulcanizable rubber, a reinforcing filler, and a sulfur compound (1) of the formula (I) which is vulcanized, where the ratio (VM/VD) of the value VM found from the degree of change before and after toluene swelling of the vulcanized rubber composition treated in a lithium aluminum hydride saturated tetrahydrofuran/toluene (ratio by volume 1/1) mixed solution using the formula (A) and the value VD found from the degree of change before and after toluene swelling of the vulcanized rubber composition treated in a propane-2-thiol (0.4 mol/l)/piperidine (0.4 mol/l) added tetrahydrofuran/toluene (ratio by volume 1/1) mixed solution using the formula (B) is not more than 0.4, more preferably where the ratio (VM/VT) of VT found from the degree of change before and after toluene swelling of the untreated vulcanized rubber composition using formula (C) and VM is not more than 0.3, more preferably not more than 0.15.

The formulas (A), (B), and (C) are generally known as Flory-Rehner formulas for finding the cross-linking density of vulcanized rubber from the swelling degree (ratio of change of volume of a vulcanized rubber before and after immersion in a good solvent). Details of these are given in P. J. Flory, J. Rehner, *Journal of Chemical Physics*, 11, 521 (1943). As a good solvent for causing swelling of rubber, benzene, toluene, n-hexane, acetone, ethanol, etc. may be mentioned, but in particular toluene is generally used. The $\mu$ in the formula, that is, the rubber-toluene interaction coefficient, is determined by the type of the rubber. In the case of natural rubber and isoprene rubber, $\mu=0.41$ (room temperature), in the case of a styrene-butadiene copolymer rubber, $\mu=0.36$ (room temperature, and in the case of a butadiene rubber, $\mu=0.32$ is appropriate.

As the means for analyzing the sulfur cross-linking structure of vulcanized rubber, the general practice is to analyze the sulfur cross-linking structures by selectively cleaving the sulfur bridges in vulcanized rubber by a reagent and finding the change in volume before and after swelling of the vulcanized rubber after the cleaving reactions, that is, finding the bridge density from the swell using the Flory-Rehner formulas. Details on this are given in A. Y. Coran, *Rubber Chemistry and Technology*, 37, 668 (1964). This is widely accepted. Further, correction for ingredients which do not swell such as the reinforcing filler etc. blended in is possible in accordance with G. Kraus, *Rubber Chemistry and Technology*, 31, 6 (1964).

Regarding the reagents for cleaving the sulfur bridges, as described in L. Bateman and R. W. Glazebrook, *Journal of Chemical Society*, 2838, 2846 (1958); M. L. Studebaker et al., *Rubber Chemistry and Technology*, 32, 941 (1959); A. Y. Coran, *Rubber Chemistry and Technology*, 37, 668 (1964); T. H. Kuan, Rubber World, vol. 192, No. 5 (1985); and Nakauchi, Naito, Utsunomiya, Masuda, and Inoue, *Journal of the Japan Rubber Association*, vol. 60, No. 5, 267 (1987), to cleave a polysulfide bridge with three or more sulfur atoms, a reagent comprising a combination of a thiol base compound and an amine base compound is preferable. Widely known is a combination of propane-2-thiol and piperidine. To cleave a disulfide and polysulfide bridge, lithium aluminum hydride is most generally used.

The present inventors performed the cleaving reaction in accordance with Nakauchi, Naito, Utsunomiya, Masuda, and Inoue, *Journal of the Japan Rubber Association*, vol. 60, No. 5, 267 (1987).

Here, the VT obtained from the toluene swell of vulcanized rubber not treated for a cleaving reaction using formula (C) is the measure of the overall bridge density. The VM obtained from the toluene swell of the vulcanized rubber treated by lithium aluminum hydride using formula (A) is the measure of the monosulfide bridge density. Therefore, the VD obtained using formula (B) is the monosulfide+disulfide bridge density minus the monosulfide bridge density, obtained from the toluene swell of vulcanized rubber treated by propane-2-thiol/piperidine, and is the measure of the disulfide bridge density.

The present inventors calculated the VM/VD and the VM/VT from the values VM, VD, and VT obtained from these formulas.

A VM/VD of more than 0.4 is not preferable since the disulfide bridge component for achieving both good failure characteristics and fatigue failure characteristics and heat aging characteristics is reduced, the balance is lost, and deterioration of the failure characteristics and the fatigue failure characteristics is induced. Further, a VM/VT of more than 0.15 is not preferable since the increase in the monosulfide bridge component causes deterioration of the failure characteristics and the fatigue failure characteristics.

As the sulfur compound of the formula (I) used in the present invention, mention may be made of polysulfide polymer having a Mooney viscosity of the material (measured in accordance with JIS K6300 using an L-shaped rotor with preheating at 100° C. for 1 minute and turning the rotor for 4 minutes) of not more than 100, preferably not more than 85, and having a number average molecular weight of 200 to 15000, preferably 1000 to 12000, a polysulfide polymer has the formula (III) to which sulfur is added in the backbone and having y of 3 to 5 on average and z of 3 to 5 on average:

$$R^3S_zR^2(S_yR^2)_mS_zR^3 \quad (III)$$

wherein $R^2$ is a $C_2$ to $C_{10}$ oxyalkylene group and/or a $C_2$ to $C_{10}$ and $O_2$ to $O_{10}$ polyoxyalkylene group, $R^3$ is at least one functional group selected from a $C_1$ to $C_{30}$ hydrocarbon group, preferably a $C_3$ to $C_{20}$ hydrocarbon group (for example, an allyl group, benzyl group, etc.), y is a number of 1 to 6, preferably 1.5 to 3.0, z is a number of 1 to 6, preferably 1.5 to 3.0, and m is an integer of 1 to 50, preferably 5 to 40, which polysulfide polymer preferably has an $R^2$ of formula (III) shown by the following formula (IV):

$$-C_2H_4OC_mH_{2m'}OC_2H_4- \quad (IV)$$

wherein, m' is an integer of 1 or 2, etc.

In a preferable embodiment of the vulcanized rubber composition according to the present invention, at least one vulcanization accelerator selected from a thiazole base, sulfenamide base, thiuram base, and dithio acid salt base accelerator is compounded in an amount of 0.5 to 5 parts by weight, preferably 0.5 to 3, of the polysulfide polymer so as to give a ratio by weight of the vulcanization accelerator and the polysulfide polymer of 0.3 to 4, preferably 0.3 to 2.

As the vulcanization accelerator, it is possible to further compound at least one vulcanization accelerator selected from a guanidine base, aldehyde-ammonia base, aldehyde-amine base, and thiourea base accelerator to 0.05 to 1 part by weight, preferably 0.1 to 0.7 part by weight, based upon 100 parts by weight of the starting rubber.

Specific examples of the vulcanization accelerators which can be used in the present invention are given below:

Thiazole-base Vulcanization Accelerators

As the thiazole, 2-mercaptobenzothiazole (MBT), dibenzothiazyldisulfide (MBTS), a zinc salt of 2-mercaptobenzothiazole (ZnMBT), a sodium salt of 2-mercaptobenzothiazole (NaMBT), a cyclohexylamine salt of 2-mercaptobenzothiazole (CMBT), and 2-(2,4-dinitrophenylthio)benzothiazole (DPBT) may be mentioned.

Sulfenamide Base Vulcanization Accelerators

As the sulfenamide, N-cyclohexyl-2-benzothiazolesulfenamide (CBS), N-t-butyl-2-benzothiazolesulfenamide (TBBS), N-oxyethylene-2-benzothiazolesulfenamide (OBS), and N,N'-diisopropyl-2-benzothiazolesulfenamide (DPBS) may be mentioned.

Thiuram Base Vulcanization Accelerators

As the thiuram, tetramethylthiuram monosulfide (TMTM), tetramethylthiuram disulfide (TMTD), tetraethylthiuram disulfide (TETD), tetrabutylthiuram disulfide (TBTD), and dipentamethylenethiuram tetrasulfide (DPTT) may be mentioned.

Guanidine Base Vulcanization Accelerators

As the guanidine, diphenylguanidine (DPG), diorthotolylguanidine (DOTG), and orthotolylbiguanide (OTBG) may be mentioned.

Dithio Acid Salt Base Vulcanization Accelerators

As the dithio acid salt, sodium dimethyldithiocarbamate (NaMDC), sodium diethyldithiocarbamate (NaEDC), sodium di-n-butyldithiocarbamate (NaBDC), lead dimethyldithiocarbamate (PbMDC), zinc dimethyldithiocarbamate (ZnMDC), zinc diethyldithiocarbamate (ZnEDC), zinc di-n-butyldithiocarbamate (ZnBDC), zinc pentamethylene dithiocarbamate (ZnPDC), zinc ethylphenyldithiocarbamate (ZnEPDC), tellurium diethyldithiocarbamate (TeEDC), selenium dimethyldithiocarbamate (SeMDC), selenium diethyldithiocarbamate (SeEDC), copper dimethyldithiocarbamate (CuMDC), iron dimethyldithiocarbamate (FeMDC), diethylamine diethyldithiocarbamate (EAEDC), piperidine pentamethylenedithiocarbamate (PPDC), and pipecoline methylpentamethylenedithiocarbamate (PMPDC) may be mentioned.

Thiourea Base Vulcanization Accelerators

As the thiourea, thiocarboanilide (CA), diorthotolylthiourea (DOTU), ethylenethiourea (EU), diethylthiourea (DEU), and trimethylthiourea (TMU) may be mentioned.

Aldehyde-ammonia Base and Aldehyde-amine Base Vulcanization Accelerators

As the aldehyde.ammonia, hexamethylenetetramine (H) and acetoaldehyde.ammonia (AA) may be mentioned.

As the aldehyde.amine, an n-butylaldehyde.aniline reaction product (BAA) may be mentioned.

As the vulcanizable rubber used in the present invention, for example any vulcanizable rubber generally used in for tire or other rubber applications in the past, specifically natural rubber (NR), butadiene rubber (BR), isoprene rubber (IR), chloroprene rubber (CR), butyl rubber (IIR), various styrene-butadiene rubbers (SBR), and other diene base rubbers or mixtures of the same may be mentioned.

As the vulcanization agent of the present invention, in addition to the above sulfur compound, sulfur and/or another sulfur donor may be used. As this sulfur, it is possible to use any sulfur being used for vulcanization of ordinary-rubber. As the form of the same, sublimated sulfur, precipitated sulfur, flower of sulfur, colloidal sulfur, etc. may be mentioned.

The compounding ratio of the rubber composition according to the present invention is not particularly limited, but preferably the sulfur compound having the formula (I) is blended in an-amount of 0.3 to 3.5 parts by weight, in terms of effective sulfur, based upon, 100 parts by weight of the vulcanizable rubber. If the amount of the sulfur is too small, vulcanization does not occur and sufficient physical properties are not obtained, while conversely if too large, scorching and other poor processability are caused.

As the reinforcing filler used in the rubber composition according to the present invention, those generally compounded for rubber use in the past, such as carbon black, silica, clay, talc, or surface-treated carbon black may be mentioned. The amount of the reinforcing filler blended in is preferably 40 to 120 parts by weight with respect to 100 parts by weight of the vulcanizable rubber.

The rubber composition according to the present invention may contain, in addition to the above essential ingredients, other ingredients generally used for blending in rubber such as other fillers, promoters such as zinc oxide and magnesium oxide, waxes, antioxidants, anti ozone crack agents, masticating accelerants, viscous resins, processing oils, and vulcanization retarders. The amounts compounded are within the general ranges unless impairing the object of the present invention.

As the vulcanization agent of the second aspect of the present invention, in addition to the above sulfur compound (1), sulfur (2) (or another sulfur donor) is used. As this sulfur (2), it is possible to use any sulfur being used for vulcanization of ordinary rubber. As the form of the same, sublimated sulfur, precipitated sulfur, flowers of sulfur, colloidal sulfur, etc. may be mentioned.

In the vulcanized rubber composition according to the second aspect of the present invention, the sulfur compound (1) of the formula (I) is compounded in an amount of not more than 20 parts by weight, preferably 1 to 10 parts by weight, more preferably 1 to 4 parts by weight, or the sulfur compound (1) and the sulfur (2) are compounded at a ratio of (1)/(2) by weight of not less than 0.5, preferably 0.6 to 5.0, in a total weight of (1)+(2) of not more than 20 parts by weight, preferably 1 to 10 parts by weight, based upon 100 parts by weight of vulcanizable rubber. A ratio (1)/(2) of less than 0.5 is not desirable since the desired cross-linking structure is not obtained and good failure characteristics and fatigue characteristics and heat aging characteristics cannot be all achieved, while an amount of sulfur compound (1) alone or a total weight of (1)+(2) of more than 20 parts by weight is not desirable since the scorch resistance of the unvulcanized rubber deteriorates.

As the reinforcing filler compounded into the rubber composition according to the present invention, those generally blended in for rubber use in the past, such as carbon black, silica, clay, talc, or surface-treated carbon black may be mentioned. The amount of the reinforcing filler compounded is preferably 40 to 150 parts by weight based upon 100 parts by weight of the vulcanizable rubber. In particular, among these, a rubber composition containing 10 to 40 parts by weight of silica and containing a silane coupling agent conventionally compounded together with the rubber composition to an amount of 1 to 20% by weight of the amount of silica blended is preferable in that the high temperature tan$\delta$ is reduced compared with a composition not using the same.

As the cross-linking structure in the second aspect of the present invention, specifically the disulfide bridges are made not more than 2.5 times the monosulfide bridges, more preferably the ratio of the monosulfide bridges causing deterioration of the failure characteristics is made not more than 30% of the whole and the ratio of the polysulfide bridges is made not less than 40%. Further, in the present invention, since a specific organic polysulfide polymer having a tetrasulfide structure is used, even in the case of a polysulfide bridge of three or more sulfur atoms, while it may have as much as eight ordinary sulfur atoms, the number of sulfur bonds is kept down to not more than 4, and therefore, the heat aging characteristics are improved. Further, the sulfur compound of the present invention can greatly shorten the vulcanization time compared with known polysulfide polymer. As the means for obtaining this cross-linking structure, combination with a vulcanization accelerator is best. It is preferable to compound at least one vulcanization accelerator selected from a sulfenamide base, thiazole base, thiuram base, and dithio acid salt base accelerator to give a ratio by weight with the polysulfide polymer of preferably 0.3 to 5, and more preferably 0.3 to 3 and further to compound, into the above combination of the vulcanization accelerator at least vulcanization accelerator selected from a guanidine base, aldehyde-ammonia base, aldehyde-amine base, and thiourea base accelerator to 0.1 to 1 part by weight.

As explained above, the vulcanized rubber composition according to the present invention is a rubber composition containing a vulcanizable rubber, a reinforcing filler, and a sulfur compound (1) of the formula (I) which is vulcanized, where the ratio (VM/VD) of the value VM found from the degree of change before and after toluene swelling of the vulcanized rubber composition treated in a lithium aluminum hydride saturated tetrahydrofuran/toluene (ratio by volume 1/1) mixed solution using the formula (A) and the value VD found from the degree of change before and after toluene swelling of the vulcanized rubber composition treated in a propane-2-thiol (0.4 mol/l)/piperidine (0.4 mol/l) added tetrahydrofuran/toluene (ratio by volume 1/1) mixed solution using the formula (D) is not less than 0.4, more preferably where the ratio (VM/VT) of VT found from the degree of change before and after toluene swelling of the untreated vulcanized rubber composition using formula (C) and VM is not more than 0.3, more preferably not more than 0.15.

The formulas (A), (D), and (C) are generally known as Flory-Rehner formulas for finding the cross-linking density of vulcanized rubber from the swelling degree (ratio of change of volume of a vulcanized rubber before and after immersion in a good solvent). Details of these are given in P. J. Flory, J. Rehner, *Journal of Chemical Physics*, 11, 521

(1943). As a good solvent for causing welling of rubber, benzene, toluene, n-hexane, acetone, ethanol, etc. may be mentioned, but in particular toluene is generally used. The $\mu$ in the formula, that is, the rubber-toluene interaction coefficient, is determined by the type of the rubber. In the case of natural rubber and isoprene rubber, $\mu$=0.41 (room temperature), in the case of a styrene-butadiene copolymer rubber, $\mu$=0.36 (room temperature, and in the case of a butadiene rubber, $\mu$=0.32 is appropriate, as mentioned above.

The means for analyzing the sulfur cross-linking structure of vulcanized rubber and the reagents for cleaving the sulfur bridges are described above.

The present inventors performed the cleaving reaction in accordance with Nakauchi, Naito, Utsunomiya, Masuda, and Inoue, *Journal of the Japan Rubber Association*, vol. 60, No. 5, 267 (1987).

Here, the VT obtained from the toluene swell of vulcanized rubber not treated for a cleaving reaction using formula (C) is the measure of the overall bridge density. The VM obtained from the toluene swell of the vulcanized rubber treated by lithium aluminum hydride using formula (A) is the measure of the monosulfide bridge density. Therefore, the VD obtained using formula (D) is the monosulfide+disulfide bridge density minus the monosulfide bridge density, obtained from the toluene swell of vulcanized rubber treated by propane-2-thiol/piperidine, and is the measure of the disulfide bridge density.

The present inventors calculated the VM/VD and the VM/VT from the values VM, VD, and VT obtained from these formulas.

A VM/VD of less than 0.4 is not preferable since the disulfide bridge component for achieving both good failure characteristics and fatigue failure characteristics and heat aging characteristics is reduced, the balance is lost, and deterioration of the failure characteristics and the fatigue failure characteristics is induced. Further, a VM/VT of more than 0.3 is not preferable since the increase in the monosulfide bridge component causes deterioration of the failure characteristics and the fatigue failure characteristics.

As the sulfur compound of the formula (I) used in the present invention, mention may be made of polysulfide polymer having a Mooney viscosity of the material (measured in accordance with JIS K6300 using an L-shaped rotor with preheating at 100° C. for 1 minute and turning the rotor for 4 minutes) of not more than 100, preferably not more than 85, and having a number average molecular weight of 200 to 15000, preferably 1000 to 12000, a polysulfide polymer has the formula (III) to which sulfur is added in the backbone and having y of 3 to 5 on average and z of 3 to 5 on average:

$$R^3S_zR^2(S_yR^2)_mS_zR^3 \qquad (III)$$

wherein $R^2$ is a $C_2$ to $C_{10}$ oxyalkylene group and/or a $C_2$ to $C_{10}$ and $O_2$ to $O_{10}$ polyoxyalkylene group, $R^3$ is at least one type of functional group selected from a $C_1$ to $C_{30}$ hydrocarbon group, preferably a $C_3$ to $C_{20}$ hydrocarbon group (for example, an allyl group, benzyl group, etc.), y is a number of 1 to 6, preferably 2 to 3, on average, z is a number of 1 to 6, preferably 2 to 3, on average, and m is an integer of 1 to 50, preferably 5 to 40, which polysulfide polymer preferably has an $R^2$ of formula (III) shown by the following formula (IV):

$$—C_2H_4OC_{m'}H_{2m'}OC_2H_4— \qquad (IV)$$

wherein m' is an integer of 1 or 2, etc.

In a preferable embodiment of the vulcanized rubber composition according to the present invention, at least one vulcanization accelerator (3) selected from thiazole base, sulfenamide base, thiuram base, and dithio acid salt base accelerators is compounded in an amount of 0.3 to 5 parts by weight, preferably 0.3 to 2.5, of the polysulfide polymer so as to give a ratio by weight of the vulcanization accelerator and the polysulfide polymer of 0.3 to 4, preferably 0.3 to 2.

As the vulcanization accelerator, it is possible to further compound at least one vulcanization accelerator selected from a guanidine base, aldehyde-ammonia base, aldehyde-amine base, and thiourea base accelerator to 0.05 to 1 part by weight, preferably 0.05 to 0.7 part by weight, based upon 100 parts by weight of the starting rubber.

As the vulcanization agent of the present invention, the above sulfur compound (1) alone or the above sulfur compound (1) and sulfur (2) (or another sulfur donor) can be used. As this sulfur (2), it is possible to use any sulfur being used for vulcanization of ordinary rubber. As the form of the same, sublimated sulfur, precipitated sulfur, flower of sulfur, colloidal sulfur, etc. may be mentioned.

In the vulcanized rubber composition according to the present invention, the sulfur compound (1) of the formula (I) is used in an amount of 20 parts by weight or less, preferably 1–10 parts by weight, more preferably 1–4 parts by weight, based upon 100 parts of the rubber, or the sulfur compound (1) and the sulfur (2) are blended in at a ratio of, (1)/(2) by weight of not less than 0.5, preferably 0.6 to 5.0, in a total weight of (1)+(2) of not more than 20 parts by weight, preferably 1 to 10 parts by weight, based upon 100 parts by weight of vulcanizable rubber. A ratio (1)/(2) of less than 0.5 is not desirable since the desired cross-linking structure is not obtained and good failure characteristics and fatigue characteristics and heat aging characteristics cannot be all achieved, while a weight of (1) or a total weight of (1)+(2) of more than 20 parts by weight is not desirable since the scorch resistance of the unvulcanized rubber deteriorates.

As the reinforcing filler blended into the rubber composition according to the present invention, ones generally blended in for rubber use in the past, such as carbon black, silica, clay, talc, or surface-treated carbon black may be mentioned. The amount of the reinforcing filler blended in is preferably 40 to 150 parts by weight, based upon 100 parts by weight of the vulcanizable rubber. In particular, among these, a rubber composition containing 10 to 40 parts by weight of silica and containing a silane coupling agent conventionally blended in together with the rubber composition to an amount of 1 to 2.0% by weight of the amount of silica blended is preferable in that the high temperature tanδ is reduced compared with a compositions not using the same.

Specific examples of the vulcanization accelerators which can be used in the second aspect of the present invention are as mentioned above.

As the vulcanizable rubber used in the present invention, for example any vulcanizable rubber generally used in for tire or other rubber applications in the past, specifically natural rubber (NR), butadiene rubber (BR), isoprene rubber (IR), chloroprene rubber (CR), butyl rubber (IIR), various styrene-butadiene rubbers (SBR), and other diene base rubbers or mixtures of the same may be mentioned.

As the vulcanization agent of the present invention, in addition to the above sulfur compound, sulfur and/or another sulfur donor may be used. As this sulfur, it is possible to use any sulfur being used for vulcanization of ordinary rubber. As the form of the same, sublimated sulfur, precipitated sulfur, flower of sulfur, colloidal sulfur, etc. may be mentioned.

The compounding ratio of the rubber composition according to the present invention is not particularly limited, but preferably the sulfur compound having the formula (I) is blended in an amount of 0.3 to 3.5 parts by weight, in terms of effective sulfur, based upon, 100 parts by weight of the vulcanizable rubber. If the amount of the sulfur is too small, vulcanization does not occur and sufficient physical properties are not obtained, while conversely if too large, scorching and other poor processability are caused.

AS the reinforcing filler used in the rubber composition according to the present invention, those generally compounded for rubber use in the past, such as carbon black, silica, clay, talc, or surface-treated carbon black may be mentioned. The amount of the reinforcing filler blended in is preferably 40 to 120 parts by weight with respect to 100 parts by weight of the vulcanizable rubber.

The rubber composition according to the present invention may contain, in addition to the above essential ingredients, other ingredients generally used for blending in rubber such as other fillers, promoters such as zinc oxide and magnesium oxide, waxes, antioxidants, anti ozone crack agents, masticating accelerants, viscous resins, processing oils, and vulcanization retarders. The amounts compounded are within the general ranges unless impairing the object of the present invention.

As the vulcanization agent of the second aspect of the present invention, in addition to the above sulfur compound (1), sulfur (2) (or another sulfur donor) can also be used. AS this sulfur (2), it is possible to use any sulfur being used for vulcanization of ordinary rubber. As the form of the same, sublimated sulfur, precipitated sulfur, flowers of sulfur, colloidal sulfur, etc. may be mentioned.

In the vulcanized rubber composition according to the second aspect of the present invention, at least one vulcanization accelerator (3) selected from a thiazole base, sulfenamide base, thiuram base, and dithio acid salt base accelerator is used in an amount of 0.3 to 5 parts by weight, preferably 0.3 to 2.5 parts by weight, based upon 100 parts by weight of the vulcanizable rubber. By compounding such a vulcanization accelerator, it becomes possible to obtain a desired cross-linking structure and possible to balance the failure characteristics, fatigue characteristics, heat aging characteristics, and heat buildup property.

As the vulcanization accelerator, it is possible to further compound at least one vulcanization accelerator selected from a guanidine base, aldehyde-ammonia base, aldehyde-amine base, and thiourea base accelerator to 0.05 to 1 part by weight, preferably 0.05 to 0.7 part by weight, based upon 100 parts by weight of vulcanizable rubber.

Specific examples of the vulcanization accelerators which can be used in the present invention are exemplified above:

As the vulcanizable rubber used in the second aspect of the present invention, for example any vulcanizable rubber generally compounded for tire use or other rubber applications in the past, specifically natural rubber (NR), butadiene rubber (BR), isoprene rubber (IR), chloroprene rubber (CR), butyl rubber (IIR), various styrene-butadiene rubbers (SBR), and other diene base rubbers or mixtures of the same may be mentioned. Note that by making 10 to 60 parts by weight in the 100 parts by weight of vulcanizable rubber a polybutadiene rubber, the high temperature side tanδ is reduced and the heat buildup property is improved.

It is preferable that the vulcanized rubber composition according to the present invention contain therein an anti-scorch agent such as for example N-(cyclohexylthio) phthalimide in an amount of 0.05 to 1 part by weight based upon 100 parts by weight of the vulcanizable rubber so as to give a superior scorch resistance and increase the ratio of disulfide cross-linking.

The rubber composition according to the present invention may contain, in addition to the above essential ingredients, other ingredients generally used in rubber use, as mentioned above.

As explained above, the rubber composition according to the third aspect of the present invention contains a vulcanizable rubber, a reinforcing filler, a sulfur compound (1) of the formula (I), and sulfur (2).

The sulfur compound (1) of the formula (I) used in the third aspect of the present invention are those mentioned above.

As the vulcanization agent of the third aspect of the present invention, in addition to the above sulfur compound (1), sulfur (2) (or another sulfur donor) is used. As this sulfur (2), it is possible to use any sulfur being used for vulcanization of ordinary rubber. As the form of the same, sublimated sulfur, precipitated sulfur, flowers of sulfur, colloidal sulfur, etc. may be mentioned.

In the vulcanized rubber composition according to the third aspect of the present invention, the sulfur compound (1) of the formula (I) and the sulfur (2) are blended in at a ratio of (1)/(2) by weight of less than 0.5, preferably 0.2 to 0.5, in a total weight of (1)+(2) of not more than 20 parts by weight, preferably 2 to 10 parts by weight, with respect to 100 parts by weight of vulcanizable rubber. A ratio (1)/(2) of 0.5 or more is not desirable since the other mechanical properties and heat buildup property deteriorate, while a total weight of (1)+(2) of more than 20 parts by weight is not desirable since the scorch property of the unvulcanized rubber remarkably deteriorates.

In a preferable embodiment of the vulcanized rubber composition according to the third aspect of the present invention, the polysulfide polymer is compounded in an amount of 0.5 to 5 parts by weight, preferably 0.5 to 3 parts by weight, and at least one type of vulcanization accelerator selected from a thiazole base, sulfenamide base, thiuram base, and dithio acid salt base accelerator is compounded in to 0.3 to 3 parts by weight.

As the vulcanization accelerator, it is possible to further compound at least one vulcanization accelerator selected from a guanidine base, aldehyde-ammonia base, aldehyde-amine base, and thiourea base accelerator to 0.05 to 1 part by weight, preferably 0.05 to 0.7 part by weight, based upon 100 parts by weight of the vulcanizable rubber.

Specific examples of the vulcanization accelerators which can be used in the present invention are those mentioned above As the vulcanizable rubber used in the third aspect of the present invention, for example, any vulcanizable rubber generally used in tire use or other rubber applications in the past, specifically natural rubber (NR), butadiene rubber (BR), isoprene rubber (IR), chloroprene rubber (CR), butyl rubber (IIR), various styrene-butadiene rubbers (SBR), and other diene base rubbers or mixtures of the same may be mentioned.

As the reinforcing filler compounded in the rubber composition according to the present invention, ones generally used in for rubber use in the past, such as carbon black, silica, clay, talc, or surface-treated carbon black may be mentioned. The amount of the reinforcing filler is preferably 40 to 120 parts by weight based upon 100 parts by weight of the vulcanizable rubber.

The rubber composition according to the present invention may have added to it, in addition to the above essential ingredients, other ingredients generally used in rubber as mentioned above.

As the diene base rubber to be compounded into the rubber composition of the fourth aspect of the present invention, for example any diene rubber generally used in tire use or other rubber applications in the past, specifically, natural rubber (NR), butadiene rubber (BR), isoprene rubber (IR), chloroprene rubber (CR), butyl rubber (IIR), various types of styrene-butadiene rubbers (SBR), and other diene-base rubbers or mixtures thereof may be mentioned.

As the reinforcing filler used in the rubber composition according to the fourth aspect of the present invention, ones generally blended in for rubber use in the past, such as carbon black and silica, may be mentioned. The amount of the reinforcing filler is 40 to 85 parts by weight, preferably 45 to 75 parts by weight, based upon 100 parts by weight of diene rubber. Note that when compounding silica, it is preferable to compound 0.1 to 15% by weight of a general use silane coupling agent (for example, vinyl trichlorosilane, vinyl trimethoxysilane, vinyl triethoxysilane, vinyl tris(β-methoxyethoxy)silane, β-(3,4-epoxycyclohexyl)ethyl trimethoxysilane, γ-glycidoxypropyl trimethoxysilane, γ-glycidoxypropylmethyl diethoxysilane, γ-glycidoxypropyl triethoxysilane, γ-methacryloxypropylmethyl dimethoxysilane, γ-methacryloxypropyl trimethoxysilane, γ-methacryloxypropylmethyl diethoxysilane, γ-methacryloxypropyl triethoxysilane, N-β(aminoethyl)γ-aminopropylmethyl dimethoxysilane, N-β(aminoethyl)γ-aminopropyl trimethoxysilane, N-β(aminoethyl)γ-aminopropyl triethoxysilane, γ-aminopropyl trimethoxysilane, γ-aminopropyl triethoxysilane, N-phenyl-γ-aminopropyl trimethoxysilane, γ-chloropropyl trimethoxysilane, γ-mercaptopropyltrimethoxysilane, bis-(3-[triethoxysilyl]-propyl)-tetrasulfane, etc.) with respect to the weight of the silica as is the general practice in the past.

The rubber composition according to the fourth aspect of the present invention further contains therein a rosin base resin and/or cyclopentadiene base resin. The amount of these resins compounded is 1 to 10 parts by weight, preferably 3 to 8 parts by weight, based upon 100 parts by weight of the diene rubber. When an amount of those resin is too small, it is not desirable since it becomes difficult to secure a high hardness and a high elongation at break and the cut resistance is liable to fall on poor roads and under heavy duty conditions, while the amount is too large, it is not desirable since the heat buildup rises and a fall in the durability is liable to be induced.

Examples of the rosin base resins usable in the fourth aspect of the present invention, gum rosins, wood rosins, tall oil rosins, etc. mainly comprised of abietic acid, neoabietic acid, pimaric acid, isopimaric acid, dehydroabietic acid. It is also possible to use disproportionated rosins obtained by disproportionation of these rosins and hydrogenated rosins obtained by hydrogenation.

Further, in the present invention, it is possible to partially maleate and/or fumarate the rosins. By maleation and/or fumaration, the effect of improvement of the heat buildup property becomes greater. For the maleation of a rosin, anhydrous maleic acid is used, while for fumaration of a rosin, fumaric acid is used. The addition reaction of the anhydrous maleic acid and/or fumaric acid to the rosin may be performed by a known method. For example, it may be done by heating and melting the stock rosin, then adding anhydrous maleic acid and/or fumaric acid to this. Further, the reaction may be performed either under pressure or at ordinary pressure.

The cyclopentadiene base resin usable in the present invention means cyclopentadiene or dicyclopentadiene and copolymers thereof with copolymerizable olefin base hydrocarbons or polymers of cyclopentadiene and/or dicyclopentadiene, but in the case of a copolymer it is preferably one containing at least 30% by weight of cyclopentadiene, dicyclopentadiene, or a mixture of cyclopentadiene and dicyclopentadiene, more preferably at least 50% by weight.

The olefin base hydrocarbon copolymerizable with cyclopentadiene or dicyclopentadiene referred to here means an olefin base hydrocarbon such as 1-butene, 2-butene, isobutylene, 1-pentene, 2-pentene, 2-methyl-1 butene, 3-methyl-1 butene, and 2-methyl-2 butene, a diolefin base hydrocarbon such as butadiene, isoprene, and 3-methylbutadiene 1.2, and a vinyl aromatic hydrocarbon such as styrene, α-methylstyrene, and vinyl toluene and can be copolymerized by a Friedel-Crafts reaction with cyclopentadiene or dicyclopentadiene in the presence of a suitable catalyst.

Further, the softening point of these cyclopentadiene base resins (ring and ball method, JIS K-5902) is preferably 50 to 200° C., more preferably 80 to 150° C. The bromine value (ASTM D-1158-57T) is preferably 40 to 150, more preferably 50 to 150. This is preferable in respect to the molecular weight for securing the cut resistance and the reactivity of the double bonds.

According to the first embodiment of the fourth aspect of the present invention, the sulfur compound (I) is used as the sulfur compound. As the sulfur compound (I) used in the present invention, a polysulfide polymer having a molecular weight of 200 to 15000, preferably 1000 to 12000, and a polysulfide polymer of the formula (III):

$$R^3S_zR^2(S_yR^2)_mS_zR^3 \qquad (III)$$

wherein $R^2$ is a $C_2$ to $C_{10}$ oxyalkylene group and/or $C_2$ to $C_{10}$ and $O_2$ to $O_{10}$ polyoxyalkylene group, $R^3$ is at least one functional group selected from $C_1$ to $C_{30}$, preferably $C_3$ to $C_{20}$ hydrocarbon groups (for example, allyl group, benzyl group, etc.), y is a number from 2.0 to 5.0, and m is an integer of 1 to 50, preferably 5 to 40, to which sulfur is added in the backbone and in which y is an average of over 3 to up to 5 and z is 1 to 5, preferably 1 to 3, which polysulfide polymer preferably has an $R^2$ of formula (III) of the following formula (IV):

$$—C_2H_4OC_{m'}H_{2m'}OC_2H_4— \qquad (IV)$$

wherein m' is an integer of 1 to 2 may be mentioned.

According to the second embodiment of the fourth aspect of the present invention, the sulfur compound (II) is used as the sulfur compound. This sulfur compound may be synthesized by a reaction of an alkali metal salt of 2-mercaptobenzothiazole with sulfur chloride, sulfur dichloride, or mixtures thereof. For example, 2 moles of 2-mercaptobenzothiazole sodium salt and 1 mole of sulfur chloride are allowed to react at room temperature to a reflux temperature for 4 hours to 20 hours using alcohol as a reaction solvent. Next, after the reaction is finished, an excess amount of water is added and the resultant mixture filtered. The residue is further washed with water and the unreacted 2-mercaptobenzothiazole sodium salt and sulfur chloride are removed. The reaction product obtained is dried, then recrystallized by, for example, methanol so as to obtain a sulfur compound (II) of a melting point of 116 to 118° C.

As the sulfur compound used in the present invention, it is possible to jointly use, in addition to the sulfur compound (I) and/or (II), if necessary or desired, sulfur and/or another sulfur donor. As such sulfur, it is possible to use any sulfur being used for ordinary rubber vulcanization. The types include sublimated sulfur, precipitated sulfur, flowers of sulfur, colloidal sulfur, etc.

As the sulfur donor capable of being jointly used with the sulfur compound of formula (I) and/or (II) in the present invention, it is possible to mention for example the polysulfide rubbers described in the Society of Rubber Industry Japan ed., *Rubber Industry Handbook <New Edition>*, Nov. 15, 1973, p. 169. Specifically, poly(ethylenetetrasulfide), poly(propylenetetrasulfide), and poly(tetraethylenesulfide) may be mentioned.

Further, it is possible to use the sulfur base sulfur compounds described in CMC ed. (Jan. 6, 1988), *Latest Technology in Polymer Addition Agents*, pp. 298 to 299. Specifically, N,N'-dithiodi(polymethylenimide) and N,N'-bis(2-benzothiazolylthio)piperadine may be mentioned.

Further, the vulcanization accelerators called the SSO and SSS type described in Japanese Unexamined Patent Publication (Kokai) No. 47-9488, Japanese Unexamined Patent Publication (Kokai) No. 47-5391, and Japanese Examined Patent Publication (Kokoku) No. 57-15611 (for example, 2,4-di(O,O'-diisopropylphosphotrithioyl)-6-morpholino-1,3,5-triazine and 2-(O,O'-diisopropylphosphotrithioyl)-4,6-di(N,N-diethylamino)-15 1,3,5-triazine) may also be suitably mentioned as sulfur donors for the present invention.

The ratio of use of the sulfur compound (I) and/or (II) and the other sulfur or sulfur donor in the present invention is not particularly limited, but preferably at least 15% by weight, more preferably at least 30% by weight, in terms of the effective sulfur, of the sulfur compound (I) and/or (II) is used based upon the total amount of effective sulfur.

The ratio of formulation in the rubber composition according to the present invention is not particularly limited, but preferably 0.5 to 3 parts by weight, preferably 1.0 to 2.5 parts by weight, in terms of effective sulfur, is blended into 100 parts by weight of diene rubber. Of the amount of sulfur blended is too small, it is not desirable since vulcanization does not occur and sufficient physical properties are liable not to be obtained, while too large an amount is not desirable since the heat aging characteristics are liable too fall.

The sulfur compound of the present invention enables sufficient vulcanization even without use of a vulcanization accelerator, but it is also possible to use a thiazole base, sulfenamide base, thiuram base, dithiocarbamate base, guanidine base, thiourea base, dithiophosphate base, xanthate base, or other accelerator. In particular, a guanidine base vulcanization agent (for example, diphenyl guanidine, diorthotolyl guanidine, and orthotolyl (bi)guanide) is preferably jointly used in an amount of 0.01 to 1.5 parts by weight based upon 100 parts by weight of the diene rubber, whereby an improvement in the heat aging characteristics due to the lesser fall in the elongation at break (EB) after heat aging and an improvement in the appearance after use along with the same are observed.

The rubber composition according to the fourth aspect of the present invention may further contain therein, as other ingredients, additives generally used for rubber, as mentioned above.

The rubber composition for heavy duty tire tread use according to the present invention may be produced as a heavy duty tire tread by processing according to a conventional general method of production. It may be used for production of a tire without requiring any new steps.

EXAMPLES

The present invention will now be further illustrated by, but is by no means limited to, the following Examples, wherein all parts and percentages are expressed on a weight basis unless otherwise noted.

Examples 1 to 11 and Comparative Examples 1 to 14

Preparation of Samples

The ingredients of the master batch of the following formulation (parts by weight) were mixed in a closed type mixer for 3 to 5 minutes. The contents thereof were discharged when reaching about 165° C.

Master Batch

| | |
|---|---:|
| IR (Nippon Zeon, Nipol IR 2200) | 100.0 |
| N339 carbon black (Tokai Carbon, Seast KH) | 50.0 |
| Zinc oxide (Zinc White No. 3) | 3.0 |
| Industrial use stearic acid | 1.0 |
| Antioxidant 6C*1 | 1.0 |
| Total | 155.0 |

*1: N-phenyl-N'-(1,3-dimethylbutyl)-p-phenylene diamine

The vulcanization agents and vulcanization accelerators (parts by weight) shown in Tables I and II were mixed into the master batch obtained by an open roll to obtain the rubber compositions.

Next, the rubber compositions obtained were press vulcanized in 15×15×0.2 cm molds at 160° C. for 20 minutes to prepare the desired test pieces which were then evaluated as to vulcanized physical properties before and after aging (100° C. ×96 hours). The resultant compositions are shown in Tables I and II.

Further, the VM, VD, and VT were measured as follows:

15×15×0.2 cm vulcanized test pieces were cut out and 0.2×0.2×0.2 cm rubber samples were prepared. These rubber samples were Soxhlet extracted using acetone, dried, precisely measured for volume, immersed for cleaving treatment in a lithium aluminum hydride saturated tetrahydrofuran/toluene mixed solution and propane-2-thiol/piperidine added tetrahydrofuran/toluene mixed solution, then rinsed. The Soxhlet extracted untreated rubber samples, the lithium aluminum hydride treated rubber samples, and the propane-2-thiol/piperidine treated rubber samples were immersed in toluene for a long period of time, then precisely measured for swelled volume and the degrees of change before and after toluene swelling were calculated. The volume percentage of the reinforcing filler was calculated from the formulation Table.

The molar volume of the toluene was 106.3. The rubber and toluene interaction constant $\mu$, since isoprene rubber is used, was 0.41.

The test methods of the vulcanized physical properties were as follows:

Dispersion at time of roll mixing: The degree of mixing of the master batch and organic sulfur compound was judged visually.

Good: State where the master batch and organic sulfur compound are compatible and sufficiently mixed together Poor: State where the organic sulfur compound is scattered in granular form and poor dispersion is caused Vulcanization time $T_{95}$ (150° C.) (minutes): Time (minutes) until reaching 95% vulcanization degree at 150° C. based on JIS K6301

Strain at 100% elongation (MPa): Measured in accordance with JIS K6301 (dumbbell type No. 3)

Elongation strength at break (MPa): Measured in accordance with JIS,K63.01 (dumbbell type No. 3)

Elongation at break (%): Measured in accordance with JIS K6301 (dumbbell type No. 3)

Crack growth length (mm): Measured according to JIS K6;301. The crack length after 100,000 flexings was measured in mm units.

TABLE I-1

| Ex. I-1 | Comp. Ex. I-1 | Comp. Ex. I-2 | Comp. Ex. I-3 | Comp. Ex. I-4 | Comp. Ex. I-5 | Comp. Ex. I-6 | Comp. Ex. I-7 | Comp. Ex. I-8 | Comp. Ex. I-9 |
|---|---|---|---|---|---|---|---|---|---|
| IR base master batch | 155 | 155 | 155 | 155 | 155 | 155 | 155 | 155 | 155 |
| Powdered sulfur | 1.50 | 1.50 | 2.00 | — | 1.50 | 1.50 | — | — | — |
| Vulcanization accelerator 1 (CBS) | 1.20 | — | — | — | — | — | — | — | — |
| Vulcanization accelerator 2 (TBBS) | — | 1.00 | — | — | 1.00 | 1.00 | 1.00 | 5.00 | 1.00 |
| Vulcanization accelerator 3 (MBTS) | — | — | 1.40 | — | — | — | — | — | — |
| Vulcanization accelerator 4 (TETD) | — | — | — | 3.50 | — | — | — | — | — |
| Vulcanization accelerator 5 (DPG) | — | — | — | — | 0.20 | — | — | — | 1.10 |
| Vulcanization accelerator 6 (DOTU) | — | — | — | — | — | 0.20 | — | — | — |
| Polysulfide 1 | — | — | — | — | — | — | 5.00 | 1.40 | 3.00 |
| Ratio of amount of polysulfide added/amount of accelerator added | — | — | — | — | — | — | 5.00 | 0.28 | 3.00 |
| VM ($\times 10^{-5}$ mol/cc) | 2.5 | 2.2 | 2.3 | 13.1 | 2.6 | 2.8 | 1.4 | 5.1 | 2.7 |
| VD ($\times 10^{-5}$ mol/cc) | 4.5 | 4.3 | 4.1 | 1.1 | 4.9 | 5.1 | 2.7 | 4.2 | 6.1 |
| VT ($\times 10^{-5}$ mol/cc) | 15.1 | 15.2 | 15.3 | 14.8 | 15.4 | 15.9 | 15.3 | 14.2 | 15.4 |
| VM/VT | 0.17 | 0.14 | 0.15 | 0.89 | 0.17 | 0.18 | 0.09 | 0.36 | 0.18 |
| VM/VD | 0.56 | 0.51 | 0.56 | 11.91 | 0.53 | 0.55 | 0.52 | 1.21 | 0.44 |
| $T_{95}$ at 150° C. (min) | 9.2 | 10.1 | 14.1 | 23.5 | 8.5 | 7.9 | 25 | 7.5 | 23 |
| (Not yet aged) | | | | | | | | | |
| Stress at 100% elongation (MPa) | 2.9 | 2.9 | 2.9 | 2.8 | 2.9 | 3.0 | 2.9 | 2.7 | 2.9 |
| Elongation strength at break (MPa) | 31.5 | 32.1 | 33.8 | 27.2 | 30.9 | 30.5 | 33.7 | 21.1 | 25.8 |
| Elongation at break (%) | 502 | 486 | 452 | 498 | 462 | 455 | 511 | 398 | 431 |
| Crack growth length (mm) | 11 | 9 | 8 | Break | 13 | 14 | 8 | Break | 25 |
| (Aged at 100° C. × 96 hr) | | | | | | | | | |
| Stress at 100% elongation (MPa) | 4.2 | 4.2 | 3.8 | 3.5 | 4.1 | 4.1 | 4.1 | 3.1 | 3.5 |
| Elongation strength at break (MPa) | 14.2 | 16.7 | 20.3 | 23.4 | 18.5 | 19.8 | 19.5 | 18.4 | 18.8 |
| Elongation at break (%) | 246 | 277 | 294 | 398 | 300 | 296 | 322 | 326 | 323 |
| Crack growth length (mm) | 23 | 18 | 17 | 45 | 17 | 17 | 19 | 45 | 29 |

| | Ex. I-1 | Ex. I-2 | Ex. I-3 | Ex. I-4 | Ex. I-5 | Ex. I-6 | Ex. I-7 | Ex. I-8 |
|---|---|---|---|---|---|---|---|---|
| IR base master batch | 155 | 155 | 155 | 155 | 155 | 155 | 155 | 155 |
| Powdered sulfur | — | — | — | — | — | — | 0.80 | 0.90 |
| Vulcanization accelerator 1 (CBS) | 1.20 | — | — | — | — | — | — | — |
| Vulcanization accelerator 2 (TBBS) | — | 1.00 | — | 0.75 | 1.00 | 1.00 | 1.00 | 1.00 |
| Vulcanization accelerator 3 (MBTS) | — | — | 1.40 | — | — | — | — | — |
| Vulcanization accelerator 4 (TETD) | — | — | — | 1.00 | — | — | — | — |
| Vulcanization accelerator 5 (DPG) | — | — | — | — | 0.20 | — | 0.20 | 0.40 |
| Vulcanization accelerator 6 (DOTU) | — | — | — | — | — | 0.20 | — | — |
| Polysulfide 1 | 3.20 | 3.00 | 3.50 | 2.00 | 3.00 | 3.00 | 1.50 | 1.50 |
| Ratio of amount of polysulfide added/amount of accelerator added | 2.67 | 3.00 | 2.50 | 1.14 | 3.00 | 3.00 | 1.50 | 1.50 |
| VM ($\times 10^{-5}$ mol/cc) | 1.4 | 1.5 | 1.9 | 2.2 | 1.8 | 2 | 2.8 | 3.1 |
| VD ($\times 10^{-5}$ mol/cc) | 4.6 | 5 | 6.3 | 6.8 | 5.3 | 5.6 | 7.1 | 7.8 |
| VT ($\times 10^{-5}$ mol/cc) | 15.1 | 15.4 | 14.6 | 15.2 | 15.7 | 15.8 | 16.1 | 16.3 |
| VM/VT | 0.09 | 0.10 | 0.13 | 0.14 | 0.11 | 0.13 | 0.17 | 0.19 |
| VM/VD | 0.30 | 0.30 | 0.30 | 0.32 | 0.34 | 0.36 | 0.37 | 0.40 |
| $T_{95}$ at 150° C. (min) | 14.6 | 27.1 | 35.2 | 30.4 | 24.2 | 22.1 | 14.1 | 12.5 |
| (Not yet aged) | | | | | | | | |
| Stress at 100% elongation (MPa) | 2.9 | 2.9 | 2.8 | 2.9 | 3.0 | 3.0 | 3.1 | 3.1 |
| Elongation strength at break (MPa) | 34.2 | 33.5 | 30.1 | 29.7 | 32.5 | 31.7 | 32.1 | 32.3 |
| Elongation at break (%) | 535 | 532 | 509 | 513 | 540 | 528 | 548 | 541 |
| Crack growth length (mm) | 14 | 12 | 15 | 20 | 17 | 18 | 11 | 13 |
| (Aged at 100° C. × 96 hr) | | | | | | | | |
| Stress at 100% elongation (MPa) | 3.7 | 3.8 | 3.6 | 3.8 | 3.9 | 3.9 | 4.1 | 4.0 |
| Elongation strength at break (MPa) | 28.7 | 28.1 | 25.3 | 24.9 | 27.3 | 26.6 | 26.3 | 26.5 |
| Elongation at break (%) | 449 | 447 | 428 | 431 | 470 | 459 | 455 | 449 |
| Crack growth length (mm) | 15 | 13 | 16 | 22 | 17 | 18 | 18 | 15 |

Table I-1 Footnotes

Note) Samples having relatively low molecular weights can be measured for molecular weight, but rubber-like high molecular weights samples cannot be determined, and therefore, the Mooney viscosity is used instead.

1) Preparation of Polysulfide 1 (4 Sulfur Atoms, molecular weight 10,000, end alkyl)

Polysulfide 1 (4 Sulfur Atoms, Allyl End)

An excess of allyl chloride was added to a polysulfide polymer (Toray Thiokol, LP-32) in the presence of an equivalent amount of triethylamine to cause a reaction. The amine hydrochloride was filtered out, then the excess allyl chloride was distilled off. 36.2 g of powdered sulfur and 0.5 g of triethylamine were added to 100 g of this polymer and a reaction caused at 90° C. for 1 hour to obtain a viscous polysulfide (average molecular weight of about 5500).

Polysulfide 2 (6 Sulfur Atoms, Allyl End)

An excess of allyl chloride was added to a polysulfide polymer (Toray Thiokol, LP-32) in the presence of an equivalent amount of triethylamine to cause a reaction. The amine hydrochloride was filtered out, then the excess allyl chloride was distilled off. 72.4 g of powdered sulfur and 0.5 g of triethylamine were added to 100 g of this polymer and a reaction caused at 90° C. for 1 hour to obtain a viscous polysulfide (average molecular weight of about 7000).

Polysulfide 3 (2 Sulfur Atoms, Allyl End)

An excess of allyl chloride was added to a polysulfide polymer (Toray Thiokol, LP-31) in the presence of an equivalent amount of triethylamine to cause a reaction. The amine hydrochloride was filtered out, then the excess allyl chloride was distilled off to obtain a viscous polysulfide (average molecular weight of about 8000).

Polysulfide 4 (4 Sulfur Atoms, Benzyl End)

An excess of benzyl chloride was added to a polysulfide polymer (Toray Thiokol, LP-31) in the presence of an equivalent amount of triethylamine to cause a reaction. The amine hydrochloride was filtered out, then the excess benzyl chloride was distilled off. 36.9 g of powdered sulfur and 0.5 g of triethylamine were added to 100 g of this polymer and a reaction caused at 90° C. for 1 hour to obtain a viscous polysulfide (average molecular weight of about 11200).

Polysulfide 5 (4 Sulfur Atoms, Hydroxy End)

Three times the molar amount of ethylene oxide was reacted with a polysulfide polymer (Toray Thiokol, LP-32) in the presence of an alkali catalyst to convert the end to a hydroxyl group. 34.5 g of powdered sulfur and 0.5 g of triethylamine were added to 100 g of this polymer and a reaction caused at 90° C. for 3 hours to obtain a viscous polysulfide (average molecular weight of about 5500).

Polysulfide Rubber 1 (4 Sulfur Atoms, End Alkyl, Mooney Viscosity of About 80)

31.6 g of 1,2-dichloroethane, 2.69 g of benzyl chloride, 141 g of sodium tetrasulfide (41% solution), and 50 g of methanol were added and reacted at room temperature for 1 hour, then rinsed to obtain a rubbery polysulfide.

Polysulfide Rubber 2 (4 Sulfur Atoms, Mooney Viscosity of About 120)

31.6 g of 1,2-dichloroethane, 135.5 g of sodium tetrasulfide (41%), and 50 g of methanol were used to obtain this in the same way as the polysulfide rubber 1.

2) Vulcanization Accelerator vulcanization accelerator 1 (CBS): N-cyclohexyl-2-benzothiazole sulfenamide Vulcanization accelerator 2 (TBBS): N-t-butyl-2-benzothiazole sulfenamide Vulcanization accelerator 3 (MBTS): dibenzothiazyl sulfide Vulcanization accelerator 4 (TETD): tetraethylthiuram disulfide Vulcanization accelerator 5 (DPG): diphenyl guanidine Vulcanization accelerator 6 (DOTU): diorthotolylthiourea

TABLE I-2

| | Ex. I-9 | Comp. Ex. I-10 | Comp. Ex. I-11 | Ex. I-10 | Comp. Ex. I-12 | Ex. I-11 | Comp. Ex. I-13 |
|---|---|---|---|---|---|---|---|
| IR base master batch | 155 | 155 | 155 | 155 | 155 | 155 | 155 |
| Vulcanization accelerator 2 (TBBS) | 1.00 | 1.00 | 1.00 | 1.00 | 1.00 | 1.00 | 1.00 |
| Polysulfide 1 | 3.00 | — | — | — | — | — | — |
| Polysulfide 2 | — | 3.00 | — | — | — | — | — |
| Polysulfide 3 | — | — | 3.00 | — | — | — | — |
| Polysulfide 4 | — | — | — | 3.00 | — | — | — |
| Polusulfide 5 | — | — | — | — | 3.00 | — | — |
| Polysulfide rubber 1 | — | — | — | — | — | 3.00 | — |
| Polysulfide rubber 2 | — | — | — | — | — | — | 3.00 |
| Ratio of amount of polysulfide added/amount of accelerator added | 3.00 | 3.00 | 3.00 | 3.00 | 3.00 | 3.00 | 3.00 |
| VM ($\times 10^{-5}$ mol/cc) | 1.6 | 2.1 | 12.1 | 1.2 | 1.2 | 0.9 | 1.1 |
| VD ($\times 10^{-5}$ mol/cc) | 5.3 | 4.7 | 1.5 | 3.1 | 2.1 | 2.9 | 2.6 |
| VT ($\times 10^{-5}$ mol/cc) | 15.6 | 15.2 | 14.1 | 15.7 | 14.8 | 16.2 | 14.7 |
| VM/VT | 0.10 | 0.14 | 0.86 | 0.08 | 0.08 | 0.06 | 0.07 |
| VM/VD | 0.30 | 0.45 | 8.07 | 0.39 | 0.57 | 0.31 | 0.42 |
| Dispersion at roll mixing | Good | Good | Good | Good | Good | Good | Poor |
| $T_{95}$ (150° C., min) | 25.1 | 19.5 | 46 | 21.1 | 41 | 29.3 | 36.3 |
| (Not yet aged) | | | | | | | |
| Stress at 100% elongation (MPa) | 3.0 | 2.8 | 1.9 | 3.2 | 2.9 | 2.3 | 1.8 |
| Elongation strength at break (MPa) | 33.8 | 33.1 | 18.7 | 34.2 | 34.2 | 34.1 | 19.4 |
| Elongation at break (%) | 541 | 538 | 580 | 546 | 539 | 550 | 581 |
| Crack growth length (mm) | 12 | 10 | Break | 18 | 11 | 20 | Break |
| (Aged at 100° C. × 96 hr) | | | | | | | |
| Stress at 100% elongation (MPa) | 3.9 | 4.1 | 2.2 | 4.5 | 4.4 | 2.9 | 2.2 |
| Elongation strength at break (MPa) | 28.4 | 21.5 | 15.9 | 27.4 | 20.5 | 26.1 | 17.1 |
| Elongation at break (%) | 454 | 328 | 464 | 437 | 340 | 399 | 432 |
| Crack growth length (mm) | 13 | 19 | 40 | 21 | 20 | 21 | Break |

Table I-2 Footnotes

1) Vulcanization accelerator 2 (TBBS): see Table I-1 footnotes.

2) Preparation of polysulfide:.see Table I-1 footnotes.

Examples II-1 to II-22 and Comparative Examples II-1 to I-28

Preparation of Samples

The ingredients of the master batches of the following formulations (parts by weight) were mixed in a closed type mixer for 3 to 5 minutes. The contents were discharged when reaching about 165° C.

| IR base master batch (parts by weight) | |
|---|---|
| IR (Nippon Zeon, Nipol IR 2200) | 100 |
| N339 carbon black (Tokai Carbon, Seast KH) | 50 |
| Zinc oxide (Zinc White No. 3) | 3 |
| Industrial use stearic acid | 1 |
| Antioxidant 6C*1 | 1 |
| Total | 155 |

| SBR base master batch (A) (parts by weight) | |
|---|---|
| SBR (Nippon Zeon, Nipol SBR 1502) | 100 |
| N220 carbon black (Tokai Carbon, Seast KH) | 62 |
| Zinc white | 3 |
| Industrial use stearic acid | 1 |
| Modified rosin resin | 6 |
| Oil | 5 |
| Antioxidant 6C*1 | 1 |
| Total | 178 |

| NR/BR base master batches (parts by weight) | | | |
|---|---|---|---|
|  | MB1 | MB2 | MB3 |
| IR (Nippon Zeon, Nipol IR 2200) | 100 | 90 | 70 |
| BR (Nippon Zeon, Nipol BR 1220) | — | 10 | 30 |
| N339 carbon black (Tokai Carbon, Seast KH) | 50 | 50 | 50 |
| Zinc oxide (Zinc White No. 3) | 3 | 3 | 3 |
| Industrial use stearic acid | 2 | 2 | 2 |
| Antioxidant 6C*1 | 2 | 2 | 2 |
| Total | 157 | 157 | 157 |

*1: N-phenyl-N'-(1,3-dimethylbutyl)-p-phenylene diamine

The vulcanization agents and vulcanization accelerators (parts by weight) shown in Tables II-1 to II-5 were kneaded into the master batches obtained by an open roll to obtain the rubber compositions.

Next, the rubber compositions obtained were press vulcanized in 15×15×0.2 cm molds at 160° C. for 20 minutes to prepare the desired test pieces which were then evaluated as to vulcanized physical properties before and after aging (100° C.—96 hours). The resultant compositions are shown in Tables II-1 to II-5.

Further, the VM, VD, and VT were measured as follows:
15×15×0.2 cm vulcanized test pieces were cut out and 0.2×0.2×0.2 cm rubber samples were prepared.

These rubber samples were Soxhlet extracted using acetone, dried, precisely measured for volume, immersed for cleaving in a lithium aluminum hydride saturated tetrahydrofuran/toluene mixed solution and propane-2-thiol/piperidine added tetrahydrofuran/toluene mixed solution, then rinsed. The Soxhlet extracted untreated rubber samples, the lithium aluminum hydride treated rubber samples, and the propane-2-thiol/piperidine treated rubber samples were immersed in toluene for a long period of time, then precisely measured for swelled volume and the degrees of change before and after toluene swelling were calculated. The volume percentage of the reinforcing filler was calculated from the formulation Table.

The molar volume of the toluene was 106.3. The rubber and toluene interaction constant $\mu$ used was 0.41 in the case of isoprene rubber, 0.36 in the case of SBR (styrene-butadiene copolymer rubber), 0.40 in the case of a mixture of isoprene rubber and butadiene rubber where the ratio of isoprene rubber/butadiene rubber is 9/1, and 0.38 in the same case where the ratio of isoprene rubber/butadiene rubber is 7/3.

The test methods of the vulcanized physical properties were as follows:

Dispersion at time of roll mixing: The degree of mixing of the master batch and organic sulfur compound was judged visually.

Good: State where the master batch and organic sulfur compound are compatible and sufficiently mixed together Poor: State where the organic sulfur compound is scattered in granular form and poor dispersion is caused Vulcanization time $T_{95}$ (150° C.) (minutes): Time (minutes) until reaching 95% vulcanization degree at 15b° C. based on JIS K6301 tans (60° C.): A Toyo Seiki Seisakusho viscoelasticity spectrometer (Rherosolid) was used for measurement at an amplitude of ±2%, at 60° C., a frequency of 20 Hz, and an initial strain of 10%. Note that the larger the value of the tanδ (60° C.), the worse the heat buildup.

Strain at 100% elongation (MPa): Measured in accordance with JIS K6301 (dumbbell type No. 3)

Elongation strength at break (MPa): Measured in accordance with JIS K6301 (dumbbell type No. 3)

Elongation at break (%): Measured in accordance with JIS K6301 (dumbbell type No. 3)

Crack growth length (mm): Measured according to JIS K6,301. The crack length after 100,000 flexings was measured in mm units.

TABLE II-1

|  | Comp. Ex. II-1 | Comp. Ex. II-2 | Comp. Ex. II-3 | Comp. Ex. II-4 | Comp. Ex. II-5 | Comp. Ex. II-6 | Comp. Ex. II-7 | Comp. Ex. II-8 | Comp. Ex. II-9 |
|---|---|---|---|---|---|---|---|---|---|
| IR base master batch | 155 | 155 | 155 | 155 | 155 | 155 | 155 | 155 | 155 |
| Powdered sulfur | 1.5 | 1.5 | 2.0 | — | 1.5 | 1.5 | — | — | — |
| Vulcanization accelerator 1 (CBS) | 1.2 | — | — | — | — | — | — | — | 1.2 |
| Vulcanization accelerator 2 (TBBS) | — | 1.0 | — | — | 1.0 | 1.0 | 1.0 | 5.0 | — |
| Vulcanization accelerator 3 (MBTS) | — | — | 1.4 | — | — | — | — | — | — |
| Vulcanization accelerator 4 (TET) | — | — | — | 3.5 | — | — | — | — | — |
| Vulcanization accelerator 5 (DPG) | — | — | — | — | 0.2 | — | — | — | — |
| Vulcanization accelerator 6 (DOTU) | — | — | — | — | — | 0.2 | — | — | — |
| Polysulfide 1 | — | — | — | — | — | — | 5.0 | 1.4 | 3.2 |
| Polysulfide 2 | — | — | — | — | — | — | — | — | — |
| Polysulfide 3 | — | — | — | — | — | — | — | — | — |

TABLE II-1-continued

|  |  |  |  |  |  |  |  |  |  |
|---|---|---|---|---|---|---|---|---|---|
| Polysulfide 4 | — | — | — | — | — | — | — | — | — |
| Polysulfide 5 | — | — | — | — | — | — | — | — | — |
| Ratio of amount of polysulfide added/amount of sulfur added | — | — | — | — | — | — | — | — | — |
| Ratio by weight of (polysulfide + sulfur)/accelerator | 1.25 | 1.5 | 1.43 | 0.0 | 1.5 | 1.5 | 5.0 | 0.28 | 2.67 |
| VM ($\times 10^{-5}$ mol/cc) | 2.5 | 2.2 | 2.3 | 13.1 | 2.6 | 2.8 | 1.4 | 5.1 | 1.4 |
| VD ($\times 10^{-5}$ mol/cc) | 4.5 | 4.3 | 4.1 | 1.1 | 4.9 | 5.1 | 2.7 | 4.2 | 4.6 |
| VM + D ($\times 10^{-5}$ mol/cc) | 7.0 | 6.5 | 6.4 | 14.2 | 7.5 | 7.9 | 4.1 | 9.3 | 6 |
| VT ($\times 10^{-5}$ mol/cc) | 15.1 | 15.2 | 15.3 | 14.8 | 15.4 | 15.9 | 15.3 | 14.2 | 15.1 |
| VM/VT | 0.17 | 0.14 | 0.15 | 0.89 | 0.17 | 0.18 | 0.09 | 0.36 | 0.09 |
| VM/VD | 0.56 | 0.51 | 0.56 | 11.91 | 0.53 | 0.55 | 0.52 | 1.21 | 0.30 |
| (VT − VM + D)/VT | 0.54 | 0.57 | 0.58 | 0.04 | 0.51 | 0.50 | 0.73 | 0.35 | 0.60 |
| Vulcanization time $T_{95}$ (150° C.) (min) | 9.2 | 10.1 | 14.1 | 23.5 | 8.5 | 7.9 | 25.0 | 7.5 | 14.6 |
| tanδ (60° C.) | 0.124 | 0.120 | 0.136 | 0.143 | 0.122 | 0.125 | 0.138 | 0.146 | 0.142 |
| (Not yet aged) |  |  |  |  |  |  |  |  |  |
| Stress at 100% elongation (MPa) | 2.9 | 2.9 | 2.9 | 2.8 | 2.9 | 3.0 | 2.9 | 2.7 | 2.9 |
| Elongation strength at break (MPa) | 31.5 | 32.1 | 33.8 | 27.2 | 30.9 | 30.5 | 33.7 | 21.1 | 34.2 |
| Elongation at break (%) | 502 | 486 | 452 | 498 | 462 | 455 | 511 | 398 | 535 |
| Crack growth length (mm) | 11 | 9 | 8 | Break | 13 | 14 | 8 | Break | 14 |
| (Aged at 100° C. × 96 hr) |  |  |  |  |  |  |  |  |  |
| Stress at 100% elongation (MPa) | 4.2 | 4.2 | 3.8 | 3.5 | 4.1 | 4.1 | 4.1 | 3.1 | 3.7 |
| Elongation strength at break (MPa) | 14.2 | 16.7 | 20.3 | 23.4 | 18.5 | 19.8 | 19.5 | 18.4 | 28.7 |
| Elongation at break (%) | 246 | 277 | 294 | 398 | 300 | 296 | 322 | 326 | 449 |
| Rate of retention of elongation strength at break | 0.45 | 0.52 | 0.60 | 0.86 | 0.60 | 0.65 | 0.58 | 0.87 | 0.84 |
| Rate of preservation of elongation at break | 0.49 | 0.57 | 0.65 | 0.80 | 0.65 | 0.65 | 0.63 | 0.82 | 0.84 |
| Crack growth length (mm) | 23 | 18 | 17 | 45 | 17 | 17 | 19 | 45 | 15 |

|  | Comp. Ex. II-10 | Comp. Ex. II-11 | Comp. Ex. II-12 | Ex. II-1 | Ex. II-2 | Ex. II-3 | Ex. II-4 | Ex. II-5 | Comp. Ex. II-13 |
|---|---|---|---|---|---|---|---|---|---|
| IR base master batch | 155 | 155 | 155 | 155 | 155 | 155 | 155 | 155 | 155 |
| Powdered sulfur | — | — | 1.6 | 1.4 | 1.2 | 1.0 | 0.9 | 0.7 | 0.5 |
| Vulcanization accelerator 1 (CBS) | — | — | — | — | — | — | — | — | — |
| Vulcanization accelerator 2 (TBBS) | 1.0 | — | 1.8 | 1.73 | 1.67 | 1.6 | 1.57 | 1.5 | 1.43 |
| Vulcanization accelerator 3 (MBTS) | — | 1.4 | — | — | — | — | — | — | — |
| Vulcanization accelerator 4 (TET) | — | — | — | — | — | — | — | — | — |
| Vulcanization accelerator 5 (DPG) | — | — | — | — | — | — | — | — | — |
| Vulcanization accelerator 6 (DOTU) | — | — | — | — | — | — | — | — | — |
| Polysulfide 1 | 3.0 | 3.5 | 0.6 | 1.0 | 1.4 | 1.8 | 2.0 | 2.4 | 2.8 |
| Polysulfide 2 | — | — | — | — | — | — | — | — | — |
| Polysulfide 3 | — | — | — | — | — | — | — | — | — |
| Polysulfide 4 | — | — | — | — | — | — | — | — | — |
| Polysulfide 5 | — | — | — | — | — | — | — | — | — |
| Ratio of amount of polysulfide added/amount of sulfur added | — | — | 0.36 | 0.71 | 1.17 | 1.8 | 2.22 | 3.43 | 5.6 |
| Ratio by weight of (polysulfide + sulfur)/accelerator | 3.0 | 2.5 | 1.22 | 1.38 | 1.56 | 1.75 | 1.65 | 2.07 | 2.30 |
| VM ($\times 10^{-5}$ mol/cc) | 1.5 | 1.9 | 5.1 | 4.4 | 4.0 | 3.6 | 3.4 | 3.0 | 2.7 |
| VD ($\times 10^{-5}$ mol/cc) | 4.0 | 6.3 | 5.1 | 5.3 | 5.6 | 5.7 | 5.7 | 5.8 | 5.9 |
| VM + D ($\times 10^{-5}$ mol/cc) | 6.5 | 8.2 | 10.2 | 9.7 | 9.6 | 9.3 | 9.2 | 8.8 | 8.5 |
| VT ($\times 10^{-5}$ mol/cc) | 15.4 | 14.6 | 15.8 | 16.3 | 16.7 | 17.1 | 17.4 | 17.8 | 18.3 |
| VM/VT | 0.10 | 0.13 | 0.32 | 0.27 | 0.24 | 0.21 | 0.20 | 0.17 | 0.15 |
| VM/VD | 0.38 | 0.30 | 0.99 | 0.82 | 0.71 | 0.63 | 0.60 | 0.52 | 0.45 |
| (VT − VM + D)/VT | 0.58 | 0.44 | 0.35 | 0.40 | 0.42 | 0.46 | 0.47 | 0.50 | 0.53 |
| Vulcanization time $T_{95}$ (150° C.) (min) | 27.1 | 35.2 | 10.2 | 10.8 | 11.2 | 12.5 | 14.5 | 19.8 | 24.1 |
| tanδ (60° C.) | 0.145 | 0.149 | 0.121 | 0.122 | 0.124 | 0.126 | 0.136 | 0.151 | 0.159 |
| (Not yet aged) |  |  |  |  |  |  |  |  |  |
| Stress at 100% elongation (MPa) | 2.9 | 2.8 | 3.0 | 3.1 | 3.2 | 3.3 | 3.3 | 3.3 | 3.4 |
| Elongation strength at break (MPa) | 33.5 | 30.1 | 31.7 | 31.2 | 31.0 | 30.9 | 31.1 | 30.6 | 31.5 |
| Elongation at break (%) | 532 | 509 | 492 | 498 | 508 | 512 | 509 | 521 | 532 |
| Crack growth length (mm) | 12 | 15 | 7 | 6 | 7 | 8 | 7 | 9 | 12 |
| (Aged at 100° C. × 96 hr) |  |  |  |  |  |  |  |  |  |
| Stress at 100% elongation (MPa) | 3.8 | 3.6 | 4.3 | 4.3 | 4.3 | 4.4 | 4.5 | 4.5 | 4.5 |
| Elongation strength at break (MPa) | 28.1 | 25.3 | 19.7 | 22.2 | 22.3 | 23.2 | 23.3 | 24.5 | 26.5 |
| Elongation at break (%) | 447 | 428 | 285 | 349 | 366 | 379 | 387 | 412 | 431 |
| Rate of retention of elongation strength at break | 0.84 | 0.84 | 0.62 | 0.71 | 0.72 | 0.75 | 0.75 | 0.80 | 0.84 |
| Rate of preservation of elongation at break | 0.84 | 0.84 | 0.58 | 0.70 | 0.72 | 0.74 | 0.76 | 0.79 | 0.81 |
| Crack growth length (mm) | 13 | 16 | Break | 32 | 25 | 19 | 17 | 11 | 13 |

TABLE II-1-continued

|  | Comp. Ex. II-14 | Ex. II-6 | Comp. Ex. II-15 | Comp. Ex. II-16 | Ex. II-7 | Comp. Ex. II-17 |
|---|---|---|---|---|---|---|
| IR base master batch | 155 | 155 | 155 | 155 | 155 | 155 |
| Powdered sulfur | 0.8 | 0.9 | 1.0 | 1.0 | 1.0 | 1.0 |
| Vulcanization accelerator 1 (CBS) | — | — | — | — | — | — |
| Vulcanization accelerator 2 (TBBS) | 1.0 | 1.0 | 1.0 | 1.0 | 1.0 | 1.0 |
| Vulcanization accelerator 3 (MBTS) | — | — | — | — | — | — |
| Vulcanization accelerator 4 (TET) | — | — | — | — | — | — |
| Vulcanization accelerator 5 (DPG) | — | — | — | — | — | — |
| Vulcanization accelerator 6 (DOTU) | — | — | — | — | — | — |
| Polysulfide 1 | 1.5 | 0.63 | — | — | — | — |
| Polysulfide 2 | — | — | 1.8 | — | — | — |
| Polysulfide 3 | — | — | — | 1.8 | — | — |
| Polysulfide 4 | — | — | — | — | 1.8 | — |
| Polysulfide 5 | — | — | — | — | — | 1.8 |
| Ratio of amount of polysulfide added/amount of sulfur added | 1.89 | 0.92 | 1.80 | 1.60 | 1.80 | 1.80 |
| Ratio by weight of (polysulfide + sulfur)/accelerator | 2.30 | 1.73 | 1.75 | 1.75 | 1.75 | 1.75 |
| VM ($\times 10^{-5}$ mol/cc) | 2.8 | 2.5 | 2.6 | 9.1 | 3.3 | 2.4 |
| VD ($\times 10^{-5}$ mol/cc) | 7.1 | 5.7 | 5.0 | 3.5 | 6.0 | 2.8 |
| VM + D ($\times 10^{-5}$ mol/cc) | 9.9 | 6.2 | 7.6 | 12.6 | 9.3 | 5.2 |
| VT ($\times 10^{-5}$ mol/cc) | 16.1 | 14.0 | 17.8 | 15.9 | 17.5 | 15.3 |
| VM/VT | 0.17 | 0.18 | 0.14 | 0.57 | 0.19 | 0.16 |
| VM/VD | 0.39 | 0.44 | 0.51 | 2.60 | 0.55 | 0.86 |
| (VT − VM + D)/VT | 0.39 | 0.42 | 0.57 | 0.21 | 0.47 | 0.66 |
| Dispersion at roll mixing | — | — | Good | Good | Good | Good |
| Vulcanization time $T_{95}$ (150° C.) (min) | 16.1 | 13.1 | 9.9 | 22.1 | 10.0 | 20.5 |
| tanδ (60° C.) (Not yet aged) | 0.152 | 0.139 | 0.12 | 0.151 | 0.122 | 0.149 |
| Stress at 100% elongation (MPa) | 3.1 | 2.7 | 3.5 | 2.7 | 3.4 | 3 |
| Elongation strength at break (MPa) | 31.2 | 28.6 | 31.6 | 22.5 | 31.5 | 30.2 |
| Elongation at break (%) | 573 | 598 | 476 | 482 | 522 | 511 |
| Crack growth length (mm) | 8 | 4 | 9 | Break | 7 | 6 |
| (Aged at 100° C. × 96 hr) | | | | | | |
| Stress at 100% elongation (MPa) | 4.1 | 3.6 | 5.1 | 3.2 | 4.6 | 4.5 |
| Elongation strength at break (MPa) | 25.6 | 21.5 | 16.4 | 18.0 | 23.9 | 18.1 |
| Elongation at break (%) | 476 | 454 | 271 | 371 | 397 | 322 |
| Rate of retention of elongation strength at break | 0.82 | 0.75 | 0.52 | 0.80 | 0.76 | 0.60 |
| Rate of preservation of elongation at break | 0.83 | 0.76 | 0.57 | 0.77 | 0.76 | 0.63 |
| Crack growth length (mm) | 14 | 17 | 31 | Break | 17 | 25 |

Table II-1 Footnotes
Powdered sulfur: 5% oil extended sulfur
1) Vulcanization accelerator
  Vulcanization accelerator 1 (CBS): N-cyclohexyl-2-benzothiazole sulfenamide
  Vulcanization accelerator 2 (TBBS): N-t-butyl-2-benzothiazole sulfenamide
  Vulcanization accelerator 3 (MBTS): dibenzothiazyl disulfide
  Vulcanization accelerator 4 (TETD): tetraethylthiuram disulfide
  Vulcanization accelerator 5 (DPG): diphenyl guanidine
  Vulcanization accelerator 6 (DOTU): diorthotolylthiourea
2) Polysulfide
Note) Samples with relatively low molecular weights can be measured for molecular weight, but rubbery high molecular weight sample cannot be obtained, and therefore, the Mooney viscosity is used instead.

Polysulfide 1 (4 Sulfur Atoms, Allyl End)
An excess of allyl chloride was added to a polysulfide polymer (Toray Thiokol, LP-32) in the presence of an equivalent amount of triethylamine to cause a reaction. The amine hydrochloride was filtered out, then the excess allyl chloride was distilled off. 36.2 g of powdered sulfur and 0.5 g of triethylamine were added to 100 g of this polymer and a reaction caused at 90° C. for 1 hour to obtain a viscous polysulfide polymer (average molecular weight of about 5500).

Polysulfide 2 (6 Sulfur Atoms, Allyl End)
An excess of allyl chloride was added to a polysulfide polymer (Toray Thiokol, LP-32) in the presence of an equivalent amount of triethylamine to cause a reaction. The amine hydrochloride was filtered out, then the excess allyl chloride was distilled off. 72.4 g of powdered sulfur and 0.5 g of triethylamine were added to 100 g of this polymer and a reaction caused at 90° C. for 1 hour to obtain a viscous polysulfide polymer (average molecular weight of about 7000).

Polysulfide 3 (2 Sulfur Atoms, Allyl End)
An excess of allyl chloride was added to a polysulfide polymer (Toray Thiokol, LP-31) in the presence of an equivalent amount of triethylamine to cause a reaction. The amine hydrochloride was filtered out, then the excess allyl chloride was distilled off to obtain a viscous polysulfide polymer (average molecular weight of about 8000).

Polysulfide 4 (4 Sulfur Atoms, Benzyl End)
An excess of benzyl chloride was added to a polysulfide polymer (Toray Thiokol, LP-31) in the presence of an equivalent amount of triethylamine to cause a reaction. The amine hydrochloride was filtered out, then the excess benzyl chloride was distilled off. 36.9 g of powdered sulfur and 0.5 g of triethylamine were added to 100 g of this polymer and a reaction caused at 90° C. for 1 hour to obtain a viscous polysulfide polymer (average molecular weight of about 11200).

Polysulfide 5 (4 Sulfur Atoms, Hydroxy End)

Three times the molar amount of ethylene oxide was reacted with a polysulfide polymer (Toray Thiokol, LP-32) in the presence of an alkali catalyst to convert the end to a hydroxyl group. 34.5 g of powdered sulfur and 0.5 g of triethylamine were added to 100 g of this polymer and a reaction caused at 90° C. for 3 hours to obtain a viscous polysulfide polymer (average molecular weight of about 5500).

Polysulfide Rubber 1 (4 Sulfur Atoms, End Alkyl. Mooney Viscosity of About 80)

31.6 g of 1,2-dichloroethane, 2.69 g of benzyl chloride, 141 g of sodium tetrasulfide (41% solution), and 50 g of methanol were added and reacted at room temperature for 1 hour, then rinsed to obtain a rubbery polysulfide.

Polysulfide Rubber 2 (4 Sulfur Atoms, Mooney Viscosity of About 120)

31.6 g of 1,2-dichloroethane, 135.5 g of sodium tetrasulfide (41%), and 50 g of methanol were used to obtain this in the same way as the polysulfide rubber 1.

Nipsil AQ: Nihon Silica Industry wet silica Si69: Degussa silane coupling agent bis-(3-(triethoxysilyl)-propyl) tetrasulfide.

TABLE II-2

|  | Comp. Ex. II-18 | Comp. Ex. II-19 | Ex. II-8 | Ex. II-9 | Ex. II-10 | Ex. II-11 | Ex. II-12 | Ex. II-13 | Ex. II-14 | Comp. Ex. II-20 |
|---|---|---|---|---|---|---|---|---|---|---|
| SBR base master batch | 178 | 178 | 178 | 178 | 178 | 178 | 178 | 178 | 178 | 178 |
| Powdered sulfur | 1.5 | 1.3 | 1.2 | 1.0 | 0.9 | 0.9 | 0.8 | 0.6 | 0.6 | 0.4 |
| Vulcanization accelerator 1 (CBS) | — | — | — | — | — | — | — | — | — | — |
| Vulcanization accelerator 2 (TBBS) | 1.4 | 1.46 | 1.49 | 1.28 | 1.0 | 1.0 | 1.33 | 1.29 | 1.29 | 1.15 |
| Vulcanization accelerator 3 (MBTS) | — | — | — | — | — | — | — | — | — | — |
| Vulcanization accelerator 4 (TET) | — | — | — | — | — | — | — | — | — | — |
| Vulcanization accelerator 5 (DPG) | — | — | — | — | — | 0.4 | — | — | 0.4 | — |
| Vulcanization accelerator 6 (DOTU) | — | — | — | — | — | — | — | — | — | — |
| Polysulfide 1 | — | 0.49 | 0.86 | 0.83 | 0.83 | 0.83 | 1.6 | 2.06 | 2.06 | 2.24 |
| Polysulfide 2 | — | — | — | — | — | — | — | — | — | — |
| Polysulfide 3 | — | — | — | — | — | — | — | — | — | — |
| Polysulfide 4 | — | — | — | — | — | — | — | — | — | — |
| Polysulfide 5 | — | — | — | — | — | — | — | — | — | — |
| Ratio of amount of polysulfide added/amount of sulfur added | — | 0.36 | 0.71 | 0.83 | 0.92 | 0.92 | 2.00 | 3.43 | 3.43 | 5.60 |
| Ratio by weight of (polysulfide + sulfur)/accelerator | — | 1.22 | 1.38 | 1.43 | 1.73 | 1.73 | 1.60 | 2.07 | 2.07 | 2.30 |
| VM ($\times 10^{-5}$ mol/cc) | 4.0 | 3.5 | 2.7 | 2.4 | 2.3 | 2.5 | 1.6 | 1.3 | 1.5 | 1.0 |
| VD ($\times 10^{-5}$ mol/cc) | 1.7 | 1.7 | 2.0 | 1.9 | 2.2 | 2.1 | 2.7 | 3.0 | 3.0 | 3.2 |
| VM + D ($\times 10^{-5}$ mol/cc) | 5.7 | 5.2 | 4.7 | 4.3 | 4.5 | 4.6 | 4.3 | 4.3 | 4.5 | 4.2 |
| VT ($\times 10^{-5}$ mol/cc) | 11.6 | 11.3 | 11.1 | 11.1 | 11.1 | 11.3 | 11.3 | 11.2 | 11.2 | 11.5 |
| VM/VT | 0.34 | 0.31 | 0.24 | 0.22 | 0.21 | 0.22 | 0.14 | 0.12 | 0.13 | 0.09 |
| VM/VD | 2.35 | 2.06 | 1.35 | 1.26 | 1.05 | 1.19 | 0.59 | 0.43 | 0.50 | 0.31 |
| (VT − VM + D)/VT | 0.51 | 0.54 | 0.58 | 0.61 | 0.59 | 0.59 | 0.62 | 0.62 | 0.60 | 0.63 |
| Vulcanization time $T_{95}$ (150° C.) (min) | 31.6 | 32.7 | 34.6 | 35.6 | 37.0 | 29.6 | 36.7 | 42.5 | 36.3 | 48.2 |
| tanδ (60° C.) (Not yet aged) | 0.339 | 0.342 | 0.343 | 0.346 | 0.346 | 0.347 | 0.351 | 0.371 | 0.374 | 0.379 |
| Stress at 100% elongation (MPa) | 2.4 | 2.4 | 2.3 | 2.3 | 2.3 | 2.4 | 2.2 | 2.2 | 2.3 | 2.1 |
| Elongation strength at break (MPa) | 26.1 | 26.4 | 25.6 | 25.1 | 24.1 | 24.3 | 24 | 23.5 | 23.1 | 22.7 |
| Elongation at break (%) | 592 | 605 | 632 | 665 | 686 | 656 | 697 | 706 | 678 | 721 |
| (Aged at 100° C. × 96 hr) |  |  |  |  |  |  |  |  |  |  |
| Stress at 100% elongation (MPa) | 3.4 | 3.3 | 3.2 | 3.1 | 3.0 | 3.1 | 2.8 | 2.7 | 2.8 | 2.5 |
| Elongation strength at break (MPa) | 17.0 | 17.4 | 17.9 | 18.3 | 18.1 | 16.7 | 18.5 | 18.8 | 18.9 | 19.1 |
| Elongation at break (%) | 355 | 375 | 442 | 479 | 515 | 499 | 537 | 579 | 570 | 620 |
| Rate of retention of elongation strength at break | 0.65 | 0.66 | 0.70 | 0.73 | 0.75 | 0.77 | 0.77 | 0.80 | 0.82 | 0.84 |
| Rate of preservation of elongation at break | 0.60 | 0.62 | 0.70 | 0.72 | 0.75 | 0.76 | 0.77 | 0.82 | 0.84 | 0.86 |

TABLE II-3

|  | Comp. Ex. II-21 | Comp. Ex. II-22 | Comp. Ex. II-23 | Ex. II-15 | Ex. II-16 | Ex. II-17 |
|---|---|---|---|---|---|---|
| IR/BR base master batch | MB1 | MB2 | MB3 | MB1 | MB2 | MB3 |
| Powdered sulfur | 1.3 | 1.5 | 1.5 | 0.9 | 0.9 | 0.9 |
| Vulcanization accelerator 2 (TBBS) | 1.0 | 1.0 | 1.0 | 1.0 | 1.0 | 1.0 |
| Polysulfide 1 (4 sulfur atoms, molecular weight 5500, end allyl) | — | — | — | 0.83 | 0.83 | 0.83 |

TABLE II-3-continued

|  | Comp. Ex. II-21 | Comp. Ex. II-22 | Comp. Ex. II-23 | Ex. II-15 | Ex. II-16 | Ex. II-17 |
|---|---|---|---|---|---|---|
| Ratio of amount of polysulfide added/amount of sulfur added | — | — | — | 0.92 | 0.92 | 0.92 |
| Ratio by weight of (polysulfide + sulfur)/accelerator | — | — | — | 1.73 | 1.73 | 1.73 |
| VM ($\times 10^{-5}$ mol/cc) | 2.2 | 2.1 | 2.0 | 2.5 | 2.4 | 2.4 |
| VD ($\times 10^{-5}$ mol/cc) | 4.3 | 4.2 | 4.3 | 5.7 | 5.7 | 5.8 |
| VM + D ($\times 10^{-5}$ mol/cc) | 6.5 | 6.3 | 6.3 | 8.2 | 8.1 | 8.2 |
| VT ($\times 10^{-5}$ mol/cc) | 15.2 | 14.9 | 14.6 | 14.0 | 13.8 | 13.8 |
| VM/VT | 0.14 | 0.14 | 0.14 | 0.18 | 0.17 | 0.17 |
| VM/VD | 0.51 | 0.50 | 0.47 | 0.44 | 0.42 | 0.41 |
| (VT − VM + D)/VT | 0.57 | 0.58 | 0.57 | 0.42 | 0.41 | 0.41 |
| Vulcanization time $T_{95}$ (150° C.) (min) | 10.0 | 10.2 | 10.7 | 13.5 | 13.8 | 13.9 |
| tanδ (60° C.) (Not yet aged) | 0.124 | 0.115 | 0.103 | 0.138 | 0.129 | 0.118 |
| Stress at 100% elongation (MPa) | 2.7 | 2.4 | 2.3 | 2.7 | 2.4 | 2.3 |
| Elongation strength at break (MPa) | 30.1 | 29.8 | 28.3 | 28.6 | 28.5 | 27.9 |
| Elongation at break (%) (Aged at 100° C. × 96 hr) | 497 | 489 | 479 | 598 | 581 | 573 |
| Stress at 100% elongation (MPa) | 3.8 | 3.4 | 3.3 | 3.5 | 3.2 | 3.1 |
| Elongation strength at break (MPa) | 19.6 | 18.8 | 17.0 | 21.5 | 21.1 | 20.1 |
| Elongation at break (%) | 298 | 279 | 254 | 449 | 424 | 418 |
| Rate of retention of elongation strength at break | 0.65 | 0.63 | 0.60 | 0.75 | 0.74 | 0.72 |
| Rate of preservation of elongation at break | 0.60 | 0.57 | 0.53 | 0.75 | 0.73 | 0.73 |

TABLE II-4

|  | Comp. Ex. II-24 | Comp. Ex. II-25 | Comp. Ex. II-26 | Ex. II-18 | Ex. II-19 | Ex. II-20 |
|---|---|---|---|---|---|---|
| IR (Nipol IR2200) | 100 | 100 | 100 | 100 | 100 | 100 |
| N339 carbon black | 45 | 40 | 30 | 45 | 40 | 30 |
| Silica (Nipsil AQ) | 5 | 10 | 20 | 5 | 10 | 20 |
| Silane coupling agent (Si69) | 0.5 | 1 | 2 | 0.5 | 1 | 2 |
| Diethylene glycol | 0.25 | 0.5 | 1 | 0.25 | 0.5 | 1 |
| Zinc white | 3 | 3 | 3 | 3 | 3 | 3 |
| Stearic acid | 2 | 2 | 2 | 2 | 2 | 2 |
| Antioxidant 6C | 2 | 2 | 2 | 2 | 2 | 2 |
| Powdered sulfur | 1.3 | 1.5 | 1.5 | 0.9 | 0.9 | 0.8 |
| Vulcanization accelerator 2 (TBBS) | 1.0 | 1.0 | 1.0 | 1.0 | 1.0 | 1.0 |
| Polysulfide 1 | — | — | — | 0.83 | 0.83 | 0.83 |
| Ratio of amount of polysulfide added/amount of sulfur added | — | — | — | 0.92 | 0.92 | 0.92 |
| Ratio by weight of (polysulfide + sulfur)/accelerator | — | — | — | 1.73 | 1.73 | 1.73 |
| VM ($\times 10^{-5}$ mol/cc) | 2.2 | 2.0 | 1.9 | 2.5 | 2.6 | 2.8 |
| VD ($\times 10^{-5}$ mol/cc) | 4.3 | 4.5 | 4.8 | 5.8 | 5.6 | 5.3 |
| VM + D ($\times 10^{-5}$ mol/cc) | 6.5 | 6.5 | 6.7 | 8.3 | 8.2 | 9.1 |
| VT ($\times 10^{-5}$ mol/cc) | 15.3 | 15.6 | 15.9 | 14.3 | 14.5 | 14.7 |
| VM/VT | 0.14 | 0.13 | 0.12 | 0.18 | 0.18 | 0.11 |
| VM/VD | 0.51 | 0.44 | 0.40 | 0.43 | 0.46 | 0.53 |
| (VT − VM + D)/VT | 0.58 | 0.56 | 0.58 | 0.42 | 0.43 | 0.45 |
| Vulcanization time $T_{95}$ (150° C.) (min) | 11.5 | 13.6 | 14.3 | 14.5 | 14.8 | 15.1 |
| tanδ (60° C.) (Not yet aged) | 0.12 | 0.116 | 0.103 | 0.131 | 0.127 | 0.112 |
| Stress at 100% elongation (MPa) | 2.8 | 2.9 | 3.1 | 2.7 | 2.9 | 3.0 |
| Elongation strength at break (MPa) | 30.1 | 29.8 | 28.3 | 28.6 | 28.5 | 27.9 |
| Elongation at break (%) (Aged at 100° C. × 96 hr) | 481 | 468 | 451 | 572 | 553 | 542 |
| Stress at 100% elongation (MPa) | 3.9 | 4.0 | 4.2 | 3.5 | 3.7 | 3.8 |
| Elongation strength at break (MPa) | 19.6 | 20.3 | 19.8 | 21.5 | 21.9 | 21.8 |
| Elongation at break (%) | 289 | 290 | 293 | 429 | 420 | 428 |
| Rate of retention of elongation strength at break | 0.65 | 0.68 | 0.70 | 0.75 | 0.77 | 0.78 |
| Rate of preservation of elongation at break | 0.60 | 0.62 | 0.65 | 0.75 | 0.76 | 0.79 |

TABLE II-5

|  | Comp. Ex. II-27 | Ex. II-21 | Ex. II-22 | Comp. Ex. II-28 |
|---|---|---|---|---|
| IR base master batch | 155 | 155 | 155 | 155 |
| Powdered sulfur | 1.5 | 0.9 | 1.0 | 1.0 |
| Vulcanization accelerator 2 (TBBS) | 1.0 | 1.0 | 1.6 | 1.6 |
| Polysulfide 1 | — | 0.83 | — | — |
| Polysulfide rubber 1 | — | — | 1.8 | — |
| Polysulfide rubber 2 | — | — | — | 1.8 |
| N-(cyclohexylthio)-phthalimide (anti-scorch agent) | 0.2 | 0.2 | — | — |
| Ratio of amount of polysulfide added/amount of sulfur added | 1.5 | 0.92 | 1.8 | 1.8 |
| Ratio by weight of (polysulfide + sulfur)/accelerator | — | 1.73 | 1.75 | 1.75 |
| VM (×10$^{-5}$ mol/cc) | 2.1 | 1.9 | 3.4 | 2.6 |
| VD (×10$^{-5}$ mol/cc) | 4 | 3.8 | 5.8 | 5.0 |
| VM + D (×10$^{-5}$ mol/cc) | 6.1 | 6.7 | 9.2 | 7.6 |
| VT (×10$^{-5}$ mol/cc) | 15.2 | 14.8 | 17.5 | 17.1 |
| VM/VT | 0.14 | 0.13 | 0.19 | 0.15 |
| VM/VD | 0.53 | 0.50 | 0.59 | 0.51 |
| (VT − VM + D)/VT | 0.60 | 0.61 | 0.47 | 0.55 |
| Dispersion at roll mixing | — | — | Good | Poor |
| Vulcanization time T$_{95}$ (150° C.) (min) | 12.2 | 14.1 | 10.2 | 11.1 |
| tan δ (60° C.) (Not yet aged) | 0.121 | 0.137 | 0.126 | 0.127 |
| Stress at 100% elongation (MPa) | 3.1 | 2.9 | 3.3 | 3.1 |
| Elongation strength at break (MPa) | 31.1 | 27.9 | 30.9 | 28.7 |
| Elongation at break (%) | 506 | 612 | 512 | 501 |
| Crack growth length (mm) (Aged at 100° C. × 96 hr) | — | — | 8 | 10 |
| Stress at 100% elongation (MPa) | 4.2 | 2.9 | 4.4 | 4.3 |
| Elongation strength at break (MPa) | 15.9 | 20.3 | 23.2 | 19.9 |
| Elongation at break (%) | 296 | 478 | 379 | 342 |
| Rate of retention of elongation strength at break | 0.51 | 0.73 | 0.75 | 0.69 |
| Rate of preservation of elongation at break | 0.58 | 0.78 | 0.74 | 0.68 |
| Crack growth length (mm) | — | — | 19 | 28 |

Examples II-22 to II-25 and Comparative Examples II-26

Preparation of Samples

The ingredients of the SBR base master batch B of the following formulations (parts by weight) and the above-mentioned IR base master batch were mixed in a closed type mixer (i.e. Banbury mixer) for 3 to 5 minutes. The contents were discharged when reaching about 165° C.

| SBR base master batch (B) (parts by weight) | |
|---|---|
| Emulsion SBR (Styrene content = 35%, Ave. Mw = 600,000) | 70 |
| Solution SBR (Styrene content = 18%, vinyl content = 8%, Ave. Mw = 500,000) | 30 |
| N339 carbon black (Tokai Carbon, Seast KH) | 75 |
| Zinc white | 3 |
| Industrial use stearic acid | 1 |
| Oil | 45 |
| Antioxidant 6C*1 | 1 |
| Total | 225 |

*1: N-phenyl-N'-(1,3-dimethylbutyl)-p-phenylene diamine

The vulcanization agents and vulcanization accelerators (parts by weight) shown in Tables I to IV were kneaded into the master batches obtained by an open roll to obtain the rubber compositions.

Next, the rubber compositions obtained were press vulcanized in 15×15×0.2 cm molds at 160° C. for 20 minutes to prepare the desired test pieces which were then evaluated as to vulcanized physical properties before and after aging (100° C.×96 hours). The resultant compositions are shown in Table II-6.

TABLE II-6

|  | Comp. Ex. II-28 | Ex. II-22 | Ex. II-23 | Ex. II-24 | Ex. II-25 |
|---|---|---|---|---|---|
| SBR base master batch (B) | 225 | 225 | 225 | — | — |
| IR base master batch | — | — | — | 155 | 155 |
| Powdered sulfur | 1.7 | 0.9 | — | — | — |
| Vulcanization accelerator 1 (CBS) | 2.5 | 1.6 | 3.3 | — | 3.0 |
| Vulcanization accelerator 2 (TBBS) | — | — | — | 3.0 | — |
| polysulfide 1 | — | 1.6 | 3.0 | 3.0 | 3.0 |
| Ratio of amount of polysulfide added/amount of accelerator added | — | 1.78 | — | — | — |
|  | — | 1.56 | 0.91 | 1.0 | 1.0 |
| VM (×10$^{-5}$ mol/cc) | 2.7 | 2.8 | 2.7 | 3.1 | 4.0 |
| VD (×10$^{-5}$ mol/cc) | 3.3 | 3.1 | 2.7 | 5.9 | 7.4 |
| VM + D (×10$^{-5}$ mol/cc) | 6.0 | 5.9 | 5.4 | 9.0 | 11.4 |
| VT (×10$^{-5}$ mol/cc) | 11.7 | 12.2 | 10.2 | 16.0 | 19.0 |
| VM/VT | 0.23 | 0.23 | 0.26 | 0.19 | 0.21 |
| VM/VD | 0.82 | 0.90 | 1.00 | 0.53 | 0.54 |
| (VT − VM + D)/VT | 0.49 | 0.52 | 0.47 | 0.44 | 0.40 |
| Vulcanization Time T$_{95}$ (160° C.) | 9.2 | 10.1 | 17.1 | 31.1 | 26.2 |
| tan δ (60° C.) (Not yet aged) | 0.243 | 0.236 | 0.245 | 0.132 | 0.133 |
| Stress at 100% elongation (MPa) | 1.9 | 2.1 | 1.9 | 2.8 | 2.7 |
| Elongation strength at break (MPa) | 19.7 | 20.0 | 19.4 | 32.1 | 31.0 |
| Elongation at break (%) | 550 | 547 | 560 | 502 | 511 |
| Crack growth length (mm) (Aged at 100° C. × 96 hr) | — | — | — | 9 | 8 |
| Stress at 100% elongation (MPa) | 4.2 | 4.0 | 3.6 | 4.1 | 4.1 |
| Elongation strength at break (MPa) | 17.2 | 19.8 | 20.1 | 24.1 | 24.6 |
| Elongation at break (%) | 350 | 405 | 445 | 371 | 379 |

TABLE II-6-continued

|  | Comp. Ex. II-28 | Ex. II-22 | Ex. II-23 | Ex. II-24 | Ex. II-25 |
|---|---|---|---|---|---|
| Retention rate of strength at break | 0.87 | 0.99 | 1.04 | 0.75 | 0.79 |
| Retention rate of elongation at break | 0.64 | 0.74 | 0.79 | 0.74 | 0.74 |
| Crack growth length (mm) | — | — | — | 20 | 19 |

Examples III-1 to III-13 and Comparative Examples III-1 to III-14

Preparation of Samples

The ingredients of the master batches of the following formulations (parts by weight) were mixed in a closed mixer for 3 to 5 minutes. The contents were discharged when reaching about 165° C.

| IR base master batch (parts by weight) | |
|---|---|
| IR (Nippon Zeon, Nipol IR 2200) | 100 |
| N339 carbon black (Tokai Carbon, Seast KH) | 50 |
| Zinc oxide (Zinc White No. 3) | 3 |
| Industrial use stearic acid | 1 |
| Antioxidant 6C*1 | 1 |
| Total | 155 |

| SBR base master batch (parts by weight) | |
|---|---|
| SBR (Nippon Zeon, Nipol 1502) | 100 |
| N220 carbon black (Mitsubishi Chemical, Diablack I) | 62 |
| Zinc white | 3 |
| Stearic acid | 1 |
| Modified rosin resin | 6 |
| Oil | 5 |
| Antioxidant 6C*1 | 1 |
| Total | 178 |

*1: N-phenyl-N'-(1,3-dimethylbutyl)-p-phenylene diamine

The vulcanization agents and vulcanization accelerators (parts by weight) shown in Tables III-1 to III-3 were kneaded into the obtained master batches by an open roll to obtain the rubber compositions.

Next, the rubber compositions obtained were press vulcanized in 15×15×0.2 cm molds at 160° C. for 20 minutes to prepare the desired test pieces which were then evaluated as to vulcanized physical properties before and after aging (100° C.×96 hours). The resultant compositions are shown in Tables III-1 to III-3.

The test methods of the vulcanized physical properties were as follows:

Dispersion at time of roll mixing: The degree of mixing of the master batch and organic sulfur compound was judged visually.

Good: State where the master batch and organic sulfur compound are compatible and sufficiently mixed together Poor: State where the organic sulfur compound is scattered in granular form and poor dispersion is caused Reversion T-3 (160° C.): The time (minutes) when the torque falls 3% from the maximum torque (at 100% vulcanization) when measured at 160° C. based on JIS K6301 (Judged as "none" when torque does not fall within 45 minutes)

Vulcanization time $T_5$ (150° C.) (minutes): Time (minutes) until reaching 95% vulcanization degree at 15° C. based on JIS K6301 tanδ (60° C.): A Toyo Seiki Seisakusho viscoelasticity spectrometer (Rheorosolid) was used for measurement at an amplitude of ±2% at 60° C., a frequency of 20 Hz, and an initial strain of 10%.

Strain at 100% elongation (MPa): Measured according to JIS K6301 (dumbbell type No. 3)

Elongation strength at break (MPa): Measured according to JIS K6301 (dumbbell type No. 3)

Elongation at break (%): Measured according to JIS K6301 (dumbbell type No. 3)

Table III-1 Footnotes

1) Vulcanization Accelerator

Vulcanization accelerator 1 (CBS): N-cyclohexyl-2-benzothiazole sulfenamide

Vulcanization accelerator 2 (TBBS): N-t-butyl-2-benzothiazole sulfenamide

Vulcanization accelerator 3 (MBTS): dibenzothiazyl sulfide

Vulcanization accelerator 4 (DPG): diphenyl guanidine

Note) Samples with relatively low molecular weights can be measured for molecular weight, but rubbery ones with high weights cannot, so the Mooney viscosity is used instead.

2) Preparation of Polysulfide

Polysulfide 1 (4 Sulfur Atoms, Allyl End)

An excess of allyl chloride was added to a polysulfide polymer (Toray Thiokol, LP-32) in the presence of an equivalent amount of triethylamine to cause a reaction. The amine hydrochloride was filtered out, then the excess allyl chloride was distilled off. 36.2 g of powdered sulfur and 0.5 g of triethylamine were added to 100 g of this polymer and a reaction caused at 90° C. for 1 hour to obtain a viscous polysulfide polymer (average molecular weight of about 5500).

Polysulfide 2 (6 Sulfur Atoms, Allyl End)

An excess of allyl chloride was added to a polysulfide polymer (Toray Thiokol, LP-32) in the presence of an equivalent amount of triethylamine to cause a reaction. The amine hydrochloride was filtered out, then the excess allyl chloride was distilled off. 72.4 g of powdered sulfur and 0.5 g of triethylamine were added to 100 g of this polymer and a reaction caused at 90° C. for 1 hour to obtain a viscous polysulfide polymer (average molecular weight of about 7000).

Polysulfide 3 (2 Sulfur Atoms, Allyl End)

An excess of allyl chloride was added to a polysulfide polymer (Toray Thiokol, LP-31) in the presence of an equivalent amount of triethylamine to cause a reaction. The amine hydrochloride was filtered out, then the excess allyl chloride was distilled off to obtain a viscous polysulfide polymer (average molecular weight of about 8000).

Polysulfide4 (4 Sulfur Atoms, Benzyl End)

An excess of benzyl chloride was added to a polysulfide polymer (Toray Thiokol, LP-31) in the presence of an equivalent amount of triethylamine to cause a reaction. The amine hydrochloride was filtered out, then the excess benzyl chloride was distilled off. 36.9 g of powdered sulfur and 0.5 g of triethylamine were added to 100 g of this polymer and a reaction caused at 90° C. for 1 hour to obtain a viscous polysulfide polymer (average molecular weight of about 11200).

Polysulfide 5 (4 Sulfur Atoms, Hydroxy End)

Three times the molar amount of ethylene oxide was reacted with a polysulfide polymer (Toray Thiokol, LP-32) in the presence of an alkali catalyst to convert the end to a hydroxyl group. 34.5 g of powdered sulfur and 0.5 g of triethylamine were added to 100 g of this polymer and a reaction caused at 90° C. for 3 hours to obtain a viscous polysulfide polymer (average molecular weight of about 5500).

Polysulfide Rubber 1 (4 Sulfur Atoms, End Alkyl, Mooney Viscosity of About 80)

31.6 g of 1,2-dichloroethane, 2.69 g of benzyl chloride, 141 g of sodium tetrasulfide (41% solution), and 50 g of methanol were added and reacted at room temperature for 1 hour, then rinsed to obtain a rubbery polysulfide.

Polysulfide Rubber 2 (4 Sulfur Atoms, Mooney Viscosity of About 120)

31.6 g of 1,2-dichloroethane, 135.5 g of sodium tetrasulfide (41%), and 50 g of methanol were used to obtain this in the same way as the polysulfide rubber 1.

TABLE III-2

|  | Comp. Ex. III-12 | Ex. III-10 | Ex. III-11 |
|---|---|---|---|
| SBR base master batch | 178 | 178 | 178 |
| Powdered sulfur | 1.5 | 1.25 | 1.0 |
| Vulcanization accelerator 2 (TBBS) | 1.4 | 1.4 | 1.4 |
| Vulcanization accelerator 4 (DPG) | — | — | — |
| Polysulfide 1 | — | 0.5 | 1.0 |
| Ratio of amount of polysulfide added/amount of sulfur added | — | 0.4 | 1.0 |
| Reversion T-30 (160° C.) | 48.3 | None | None |
| Vulcanization time $T_{95}$ (150° C.) | 31.6 | 32.8 | 34.6 |
| tan$\delta$ (60° C.) | 0.339 | 0.34 | 0.356 |
| Stress at 100% elongation (MPa) | 2.4 | 2.4 | 2.3 |
| Elongation strength at break (MPa) | 26.1 | 26.4 | 25.6 |
| Elongation at break (%) | 592 | 599 | 621 |

TABLE III-1

|  | Comp. Ex. III-1 | Comp. Ex. III-2 | Comp. Ex. III-3 | Comp. Ex. III-5 | Ex. III-1 | Ex. III-2 | Ex. III-3 | Comp. Ex. III-6 | Ex. III-4 | Comp. Ex. III-7 |
|---|---|---|---|---|---|---|---|---|---|---|
| IR base master batch | 155 | 155 | 155 | 155 | 155 | 155 | 155 | 155 | 155 | 155 |
| Powdered sulfur | 1.5 | 1.5 | 2.0 | 1.5 | 1.35 | 1.25 | 1.2 | 1.1 | 1.25 | 1.1 |
| Vulcanization accelerator 1 (CBS) | 1.2 | — | — | — | — | — | — | — | 1.2 | 1.2 |
| Vulcanization accelerator 2 (TBBS) | — | 1.0 | — | 1.0 | 1.0 | 1.0 | 1.0 | 1.0 | — | — |
| Vulcanization accelerator 3 (MBTS) | — | — | 1.4 | — | — | — | — | — | — | — |
| Vulcanization accelerator 4 (DPG) | — | — | — | 0.2 | — | — | — | — | — | — |
| Polysulfide 1 | — | — | — | — | 0.3 | 0.5 | 0.6 | 0.8 | 0.5 | 0.8 |
| Polysulfide 2 | — | — | — | — | — | — | — | — | — | — |
| Polysulfide 3 | — | — | — | — | — | — | — | — | — | — |
| Polysulfide 4 | — | — | — | — | — | — | — | — | — | — |
| Polysulfide 5 | — | — | — | — | — | — | — | — | — | — |
| Ratio of amount of polysulfide added/amount of sulfur added | — | — | — | — | 0.22 | 0.4 | 0.5 | 0.73 | 0.4 | 0.73 |
| Reversion T-30 (160° C.) | 32.0 | 35.2 | 41.5 | 31.2 | None | None | None | None | None | None |
| Vulcanization time $T_{95}$ (150° C.) | 9.2 | 10.1 | 14.1 | 8.5 | 10.1 | 10.2 | 10.4 | 12.1 | 9.4 | 10.1 |
| tan$\delta$ (60° C.) | 0.124 | 0.120 | 0.136 | 0.122 | 0.121 | 0.122 | 0.123 | 0.130 | 0.124 | 0.136 |
| Stress at 100% elongation (MPa) | 2.9 | 2.9 | 2.9 | 2.9 | 2.9 | 2.9 | 2.9 | 2.7 | 2.9 | 2.8 |
| Elongation strength at break (MPa) | 31.5 | 32.1 | 33.8 | 30.9 | 32.2 | 32.3 | 32.1 | 33.1 | 31.3 | 33.2 |
| Elongation at break (%) | 502 | 486 | 452 | 462 | 489 | 487 | 490 | 507 | 503 | 515 |

|  | Ex. III-5 | Comp. Ex. III-8 | Ex. III-6 | Ex. III-7 | Ex. III-8 | Comp. Ex. III-9 | Ex. III-10 | Ex. III-9 | Comp. Ex. III-11 |
|---|---|---|---|---|---|---|---|---|---|
| IR base master batch | 155 | 155 | 155 | 155 | 155 | 155 | 155 | 155 | 155 |
| Powdered sulfur | 1.7 | 1.5 | 1.25 | 1.25 | 1.25 | 1.25 | 1.25 | 1.25 | 1.25 |
| Vulcanization accelerator 1 (CBS) | — | — | — | 1.2 | — | — | — | — | — |
| Vulcanization accelerator 2 (TBBS) | — | — | 1.0 | — | 1.0 | 1.0 | 1.0 | 1.0 | 1.0 |
| Vulcanization accelerator 3 (MBTS) | 1.4 | 1.4 | — | — | — | — | — | — | — |
| Vulcanization accelerator 4 (DPG) | — | — | 0.2 | 0.2 | — | — | — | — | — |
| Polysulfide 1 | 0.6 | 1.0 | 0.5 | 0.5 | 0.5 | — | — | — | — |
| Polysulfide 2 | — | — | — | — | — | 0.5 | — | — | — |
| Polysulfide 3 | — | — | — | — | — | — | 0.5 | — | — |
| Polysulfide 4 | — | — | — | — | — | — | — | 0.5 | — |
| Polysulfide 5 | — | — | — | — | — | — | — | — | 0.5 |
| Ratio of amount of polysulfide added/amount of sulfur added | 0.35 | 0.67 | 0.4 | 0.4 | 0.4 | 0.4 | 0.4 | 0.4 | 0.4 |
| Dispersion at roll mixing | — | — | — | — | Good | Good | Good | Good | Good |
| Reversion T-30 (160° C.) | None | None | None | None | None | 43.0 | None | None | None |
| Vulcanziation time $T_{95}$ (150° C.) | 14.5 | 15.6 | 8.6 | 7.1 | 10.2 | 9.8 | 11.5 | 10.3 | 12.6 |
| tan$\delta$ (60° C.) | 0.138 | 0.149 | 0.123 | 0.125 | 0.122 | 0.121 | 0.131 | 0.123 | 0.132 |
| Stress at 100% elongation (MPa) | 3.0 | 3.1 | 2.9 | 3.0 | 2.9 | 3.1 | 2.7 | 2.9 | 2.6 |
| Elongation strength at break (MPa) | 33.1 | 334.2 | 31.1 | 32.3 | 32.3 | 32.8 | 30.3 | 32.1 | 29.5 |
| Elongation at break (%) | 457 | 470 | 468 | 475 | 487 | 467 | 501 | 485 | 511 |

TABLE III-3

| | Comp. Ex. III-13 | Ex. III-12 | Ex. III-13 | Comp. Ex. III-14 |
|---|---|---|---|---|
| IR base master batch | 155 | 155 | 155 | 155 |
| Powdered sulfur | 1.5 | 1.25 | 1.25 | 1.25 |
| Vulcanization accelerator 2 (TBBS) | 1.0 | 1.0 | 1.0 | 1.0 |
| Polysulfide 1 | — | 0.5 | — | — |
| Polysulfide rubber 1 | — | — | 0.50 | — |
| Polysulfide rubber 2 | — | — | — | 0.55 |
| N-(cyclohexylthio) phtalimide | 0.2 | 0.2 | — | — |
| Ratio of amount of polysulfide added/amount of sulfur added | — | 0.4 | 0.4 | 0.4 |
| Dispersion at roll mixing | Good | Good | Good | Poor |
| Reversion T-30 (160° C.) | 35.2 | None | None | None |
| Vulcanization time T$_{95}$ (150° C.) | 10.1 | 10.3 | 10.0 | 10.5 |
| tanδ (60° C.) | 0.120 | 0.123 | 0.120 | 0.121 |
| Stress at 100% elongation (MPa) | 2.9 | 2.8 | 3.1 | 2.7 |
| Elongation strength at break (MPa) | 32.1 | 32.5 | 32.9 | 29.1 |
| Elongation at break (%) | 486 | 492 | 488 | 456 |

Standard Example IV-1 and Examples IV-1 to IV-6

Ingredients

1: Natural rubber NR: RSS#3
2: SBR1502: made by Nippon Zeon
3: BR1220: made by Nippon Zeon
4: N-110 carbon black: DIA BLACK A made by Mitsubishi Chemical
5: N-220 carbon black: DIA BLACK I made by Mitsubishi Chemical
6: N-330 carbon black: DIA BLACK H made by Mitsubishi Chemical
7: Silica: Nipsil AQ made by Nihon Silica Industry
8: Resin 1: Haritack AQ-90A (rosin base resin) made by Harima Chemical
9: Resin 2: China gum rosin (rosin base resin) made by Arakawa Chemical Industry
10: Resin 3: Marucarets M-600 (phonetic) (dicyclopentadiene base resin) made by Maruzen Oleochemical
11: Antioxidant 6 PPD: N-phenyl-N'-(1,3-dimethylbutyl)-p-phenylene diamine made by FLEXSIS
12: Antioxidant RD: poly-(2,2,4-trimethyl-1,2-dihydroxyquinoline) made by Ouchi Shinko Chemical
13: Wax: Paraffin wax made by Japan Wax
14: Stearic acid: made by NOF Corporation
15: Zinc white: made by Seido Chemical
16: Aromatic oil: made by Showa Shell
17: Vulcanization accelerator NS: N-tert-butyl-2-benzothiazolyl sulfenamide made by Ouchi Shinko Chemical
18: Vulcanization accelerator DPG: diphenylguanidine made by Sumitomo Chemical
19: 5% oil extended sulfur: made by Karuizawa Refinery
20: Sulfur compound 1 (tetrasulfide-1): An excess of allyl chloride was added to a polysulfide polymer (Toray Thiokol, LP-32) in the presence of an equivalent amount of triethylamine to cause a reaction. The amine hydrochloride was filtered out, then the excess allyl chloride was distilled off. 36.2 g of powdered sulfur and 0.5 g of triethylamine were added to 100 g of this polymer and a reaction caused at 90° C. for 1 hour to obtain a viscous polysulfide (average molecular weight of about 5500).
21: Sulfur compound 2 (tetrasulfide-2): 56 g of 2-mercaptobenzothiazole sodium salt was dissolved in 100 ml of methanol. 20 g of sulfur chloride was added dropwise into this. After the end of the dropping, the solution was allowed to further react at room temperature for 6 hours next, 300 ml of distilled water was added to the reaction mixture, the mixture was filtered by a glass filter, and the crystals were washed further by distilled water several times and then dried to obtain the target compound.

The results of elementary analysis of the compound obtained (figures in parentheses shown theoretical values) were as follows:

C: 46.25% (46.13%), H: 2.22% (2.21%), N: 7.62% (7.68%), S: 43.91% (43.98%)

Test Methods

Tensile properties: Measured according to JIS K6251

Hardness (Hs): Measured according to JIS K6253 at 20° C.

tanδ: Measured using a Toyo Seiki Seisakusho viscoelasticity spectrometer at a static strain of 10%, a dynamic strain of ±2%, and a frequency of 20 Hz.

Abrasion resistance: Measured using a Lambourn abrasion tester (made by Iwamoto Seisakusho) under conditions of a load of 5 kg, a slip of 25%, a time of 4 minutes, and room temperature with the amount of abrasion loss indicated as an index. Note that the larger the value, the better the abrasion resistance shown.

Preparation of Samples

The ingredients other than the sulfur compound and the vulcanization accelerator in each of the formulations (parts by weight) shown in Table IV-1 were kneaded by a Banbury mixer for 4 minutes and the contents discharged when reaching about 160° C. The sulfur compound and vulcanization accelerator shown in Table IV-1 were mixed into the master batch obtained by an open roll to obtain a rubber composition. The unvulcanized physical properties and the vulcanized physical properties of the obtained rubber composition were measured. The resultant compositions are shown in Table IV-1.

Preparation of Test Pieces

The obtained rubber compositions were press vulcanized in predetermined molds at 150° C. for 45 minutes to prepare the desired test pieces.

TABLE IV-1

|  | Standard Ex. IV-5 | Ex. IV-1 | Ex. IV-2 | Ex. IV-3 | Ex. IV-4 | Ex. IV-5 | Ex. IV-6 |
|---|---|---|---|---|---|---|---|
| SBR 1502*2 | 100.0 | 100.0 | 100.0 | 100.0 | 100.0 | 100.0 | 100.0 |
| N220 carbon black*5 | 60.0 | 60.0 | 60.0 | 60.0 | 60.0 | 60.0 | 60.0 |
| Resin 1*8 | 5.0 | 5.0 | 5.0 | 5.0 | 5.0 | 5.0 | 5.0 |
| Antioxidant 6PPD*11 | 2.0 | 2.0 | 2.0 | 2.0 | 2.0 | 2.0 | 2.0 |
| Antioxidant RD*12 | 2.0 | 2.0 | 2.0 | 2.0 | 2.0 | 2.0 | 2.0 |
| Wax*13 | 2.0 | 2.0 | 2.0 | 2.0 | 2.0 | 2.0 | 2.0 |
| Stearic acid*14 | 1.0 | 1.0 | 1.0 | 1.0 | 1.0 | 1.0 | 1.0 |
| Zinc white*15 | 3.0 | 3.0 | 3.0 | 3.0 | 3.0 | 3.0 | 3.0 |
| Aromatic oil*16 | 5.0 | 5.0 | 5.0 | 5.0 | 5.0 | 5.0 | 5.0 |
| Vulcanization accelerator NS*17 | 1.4 | 1.4 | 1.4 | 1.4 | 1.4 | 1.4 | 1.4 |
| Vulcanization accelerator DPG*18 | — | — | — | — | 0.05 | 0.1 | 0.2 |
| 5% oil extended sulfur*18 | 1.5 | 1.0 | 0.5 | — | 1.0 | 1.0 | 1.0 |
| Sulfur compound 1*20 | — | 0.83 | 1.67 | 2.5 | 0.83 | 0.83 | 0.83 |
| (converted to amount of effective sulfur) | (1.4) | (1.4) | (1.3) | (1.3) | (1.4) | (1.4) | (1.4) |
| Tensile properties* |  |  |  |  |  |  |  |
| BL |  |  |  |  |  |  |  |
| 300% MOD | 8.7 | 8.7 | 8.6 | 8.6 | 8.6 | 8.8 | 9.0 |
| TB | 23.0 | 22.8 | 22.5 | 22.0 | 23.0 | 23.8 | 24.8 |
| EB | 691 | 681 | 679 | 670 | 678 | 687 | 675 |
| AG |  |  |  |  |  |  |  |
| 300% MOD | 11.6 | 11.2 | 11.0 | 11.2 | 11.3 | 11.6 | 11.4 |
| TB | 22.3 | 21.8 | 21.4 | 20.7 | 21.9 | 22.6 | 23.5 |
| EB | 550 | 571 | 578 | 591 | 577 | 597 | 607 |
| Drop in EB after aging |  |  |  |  |  |  |  |
| ΔEB | 141 | 110 | 101 | 79 | 101 | 90 | 88 |
| Hs (20° C.) | 68 | 68 | 67 | 67 | 68 | 69 | 69 |
| tanδ (60° C.) | 0.307 | 0.308 | 0.307 | 0.312 | 0.308 | 0.307 | 0.309 |
| Abrasion resistance (index) | 100 | 105 | 120 | 156 | 106 | 103 | 105 |

BL: Value measured before heat aging treatment
AG: Value measured after heat aging treatment (80° C. × 96 hours)
ΔEB = BL-AG Standard Example IV-2 and Examples IV-7 to IV-9

Preparation of Samples

The ingredients other than the sulfur compound and the vulcanization accelerator in each of the formulations (parts by weight) shown in Table IV-2 were mixed by a Banbury mixer for 4 minutes and the contents discharged when reaching about 160° C. The sulfur compound and vulcanization accelerator shown in Table IV-2 were kneaded into the master batch obtained by an open roll to obtain a rubber composition. The unvulcanized physical properties and the vulcanized physical properties of the obtained rubber composition were measured. The results are shown in Table IV-2.

Preparation of Test Pieces

The obtained rubber compositions were press vulcanized in predetermined molds at 150° C. for 45 minutes to prepare the desired test pieces.

TABLE IV-2

|  | Standard Ex. IV-2 | Ex. IV-7 | Ex. IV-8 | Ex. IV-9 |
|---|---|---|---|---|
| NR*1 | 100.0 | 100.0 | 100.0 | 100.0 |
| N220 carbon black*5 | 20.0 | 20.0 | 20.0 | 20.0 |
| N330 carbon black*6 | 20.0 | 20.0 | 20.0 | 20.0 |
| Silica*7 | 5.0 | 5.0 | 5.0 | 5.0 |
| Resin 2*9 | 5.0 | 5.0 | 5.0 | 5.0 |
| Antioxidant 6PPD*11 | 2.0 | 2.0 | 2.0 | 2.0 |
| Antioxidant RD*12 | 2.0 | 2.0 | 2.0 | 2.0 |
| Wax*13 | 2.0 | 2.0 | 2.0 | 2.0 |
| Stearic acid*14 | 1.0 | 1.0 | 1.0 | 1.0 |
| Zinc white*15 | 3.0 | 3.0 | 3.0 | 3.0 |
| Aromatic oil*16 | 1.0 | 1.0 | 1.0 | 1.0 |
| Vulcanization accelerator NS*17 | 1.1 | 1.1 | 1.1 | 1.1 |
| Vulcanization accelerator DPG*18 | — | — | 0.2 | 0.2 |
| 5% oil extended sulfur*19 | 1.5 | 1.0 | 1.0 | — |
| Sulfur compound 1*20 | — | 0.83 | 0.83 | 2.5 |
| (converted to amount of effective sulfur) | (1.4) | (1.4) | (1.4) | (1.3) |
| Tensile properties* |  |  |  |  |
| BL | 9.5 | 9.5 | 9.8 | 9.4 |
| 200% MOD |  |  |  |  |
| TB | 26.5 | 26.4 | 28.4 | 25.6 |
| EB | 582 | 572 | 566 | 561 |
| AG | 11.6 | 11.2 | 11.4 | 11.2 |
| 300% MOD |  |  |  |  |
| TB | 25.5 | 25.0 | 26.7 | 23.9 |
| EB | 498 | 519 | 545 | 539 |
| Drop in EB after aging |  |  |  |  |
| ΔEB | 84 | 53 | 21 | 22 |
| Hs (20° C.) | 55 | 55 | 56 | 54 |
| tanδ (60° C.) | 0.143 | 0.144 | 0.145 | 0.148 |

TABLE IV-2-continued

|  | Standard Ex. IV-2 | Ex. IV-7 | Ex. IV-8 | Ex. IV-9 |
|---|---|---|---|---|
| Abrasion resistance (index) | 100 | 108 | 110 | 162 |

BL: Value measured before heat aging treatment
AG: Value measured before heat aging treatment (80° C. × 96 hours)
ΔEB = BL – AG

Standard Examples IV-3 and IV-4 and Examples IV-10 to IV-12

Preparation of Samples

The ingredients other than the sulfur compound and the vulcanization accelerator in each of the formulations (parts by weight) shown in Table IV-3 were kneaded by a Banbury mixer for 4 minutes and the contents discharged when reaching about 160° C. The sulfur compound and vulcanization accelerator shown in Table IV-3 were kneaded into the obtained master batch by an open roll to obtain a rubber composition. The unvulcanized physical properties and the vulcanized physical properties of the obtained rubber composition were measured. The results are shown in Table IV-3.

Preparation of Test Pieces

The obtained rubber compositions were press vulcanized in predetermined molds at 150° C. for 45 minutes to prepare the desired test pieces.

TABLE IV-3

|  | Standard Ex. IV-3 | Ex. IV-10 | Ex. IV-11 | Standard Ex. IV-4 | Ex. IV-12 |
|---|---|---|---|---|---|
| NR*1 | 70.0 | 70.0 | 70.0 | 55.0 | 55.0 |
| SBR 1502*2 | — | — | — | 22.0 | 22.0 |
| BR 1220*3 | 30.0 | 30.0 | 30.0 | 23.0 | 23.0 |
| N110 carbon black*4 | — | — | — | 50.0 | 50.0 |
| N220 carbon black*5 | 50.0 | 50.0 | 50.0 | — | — |
| Resin 3*10 | 2.0 | 2.0 | 2.0 | 2.0 | 2.0 |
| Antioxidant 6PPD*11 | 2.0 | 2.0 | 2.0 | 2.0 | 2.0 |
| Antioxidant RD*12 | 2.0 | 2.0 | 2.0 | 2.0 | 2.0 |
| Wax*13 | 2.0 | 2.0 | 2.0 | 2.0 | 2.0 |
| Stearic acid*14 | 1.0 | 1.0 | 1.0 | 1.0 | 1.0 |
| Zinc white*15 | 3.0 | 3.0 | 3.0 | 3.0 | 3.0 |
| Aromatic oil*16 | 3.0 | 3.0 | 3.0 | 3.0 | 3.0 |
| Vulcanization accelerator NS*17 | 1.2 | 1.2 | 1.2 | 1.0 | 1.0 |
| Vulcanization accelerator DPG*18 | — | — | 0.2 | — | — |
| 5% oil extended sulfur*19 | 1.5 | 1.0 | 1.0 | 1.2 | — |
| Sulfur compound 1*20 | — | 0.83 | 0.83 | — | 2.0 |
| (converted to amount of effectived sulfur) | (1.4) | (1.4) | (1.4) | (1.1) | (1.0) |
| Tensile properties* |  |  |  |  |  |
| BL 300% MOD | 11.4 | 11.0 | 11.5 | 10.6 | 10.1 |
| TB | 26.5 | 26.4 | 27.0 | 22.4 | 23.0 |

TABLE IV-3-continued

|  | Standard Ex. IV-3 | Ex. IV-10 | Ex. IV-11 | Standard Ex. IV-4 | Ex. IV-12 |
|---|---|---|---|---|---|
| EB | 552 | 550 | 566 | 512 | 524 |
| AG 300% MOD | 12.6 | 12.1 | 12.5 | 11.6 | 11.2 |
| TB | 23.5 | 23.0 | 24.0 | 20.1 | 21.0 |
| EB | 513 | 525 | 545 | 452 | 488 |
| Drop in EB after aging |  |  |  |  |  |
| ΔEB | 39 | 25 | 21 | 60 | 36 |
| Hs (20° C.) | 62 | 61 | 62 | 65 | 65 |
| tanδ (60° C.) | 0.181 | 0.185 | 0.180 | 0.185 | 0.190 |
| Abrasion resistance (index) | 100 | 110 | 115 | 100 | 148 |

BL: Value measured before heat aging treatment
AG: Value measured before heat aging treatment (80° C. × 96 hours)
ΔEB = BL – AG

Standard Example IV-5 and Examples IV-13 to IV-15

Preparation of Samples

The ingredients other than the sulfur compound and the vulcanization accelerator in each of the formulations (parts by weight) shown in Table IV-4 were mixed by a Banbury mixer for 4 minutes and the contents discharged when reaching about 160° C. The sulfur compound and vulcanization accelerator shown in Table IV-4 were mixed into the master batch obtained by an open roll to obtain a rubber composition. The unvulcanized physical properties and the vulcanized physical properties of the obtained rubber composition were measured. The resultant compositions are shown in Table IV-4.

Preparation of Test Pieces

The obtained rubber compositions were press vulcanized in predetermined molds at 150° C. for 45 minutes to prepare the desired test pieces.

TABLE IV-4

|  | Comp. Ex. IV-5 | Ex. IV-13 | Ex. IV-14 | Ex. IV-15 |
|---|---|---|---|---|
| SBR 1502*2 | 100.0 | 100.0 | 100.0 | 100.0 |
| N220 carbon black*5 | 60.0 | 60.0 | 60.0 | 60.0 |
| Resin 1*8 | 5.0 | 5.0 | 5.0 | 5.0 |
| Antioxidant 6PPD*11 | 2.0 | 2.0 | 2.0 | 2.0 |
| Antioxidant RD*12 | 2.0 | 2.0 | 2.0 | 2.0 |
| Wax*13 | 2.0 | 2.0 | 2.0 | 2.0 |
| Stearic acid*14 | 1.0 | 1.0 | 1.0 | 1.0 |
| Zinc white *15 | 3.0 | 3.0 | 3.0 | 3.0 |
| Aromatic oil*16 | 5.0 | 5.0 | 5.0 | 5.0 |
| Vulcanization accelerator NS*17 | 1.4 | 1.4 | 1.4 | 1.4 |
| 5% oil extended sulfur*18 | 1.5 | 1.0 | 0.5 | — |
| Sulfur compound 2*20 | — | 0.83 | 1.67 | 2.5 |
| (converted to amount of effective sulfur) | (1.4) | (1.3) | (1.2) | (1.1) |
| Tensile properties (148° C. × 45 min)* |  |  |  |  |
| BL 300% MOD | 8.7 | 8.5 | 8.0 | 7.9 |

TABLE IV-4-continued

|  | Comp. Ex. IV-5 | Ex. IV-13 | Ex. IV-14 | Ex. IV-15 |
|---|---|---|---|---|
| TB | 23.0 | 22.8 | 22.5 | 22.0 |
| EB | 691 | 681 | 390 | 701 |
| AG 300% MOD |  |  |  |  |
| TB | 22.3 | 21.8 | 21.4 | 20.7 |
| EB | 550 | 585 | 601. | 630 |
| Drop in EB after aging |  |  |  |  |
| ΔEB | 141 | 96 | 89 | 71 |
| Tenisle properties (160° C. × 45 min)* |  |  |  |  |
| BL 300% MOD | 7.9 | 7.7 | 7.3 | 7.1 |
| TB | 21.4 | 23.4 | 23.8 | 23.8 |
| EB | 706 | 710 | 740 | 750 |
| AG 300% MOD | 12.2 | 11.4 | 11.1 | 11.0 |
| TB | 21.5 | 22.4 | 22.6 | 22.4 |
| EB | 538 | 612 | 650 | 676 |
| Drop in EB after aging |  |  |  |  |
| ΔEB | 168 | 98 | 90 | 74 |
| Hs (20° C.) | 68 | 68 | 68 | 67 |
| tanδ (60° C.) | 0.307 | 0.312 | 0.315 | 0.322 |
| Abrasion resistance (index) | 100 | 121 | 141 | 156 |

BL: Value measured before heat aging treatment
AG: Value measured before heat aging treatment (80° C. × 96 hours)
ΔEB = BL − AG

Standard Examples IV-6 to IV-8 and Examples IV-16 to IV-18

Preparation of Samples

The ingredients other than the sulfur compound and the vulcanization accelerator in each of the formulations (parts by weight) shown in Table IV-5 were mixed by a Banbury mixer for 4 minutes and the contents discharged when reaching about 160° C. The sulfur compound and vulcanization accelerator shown in Table IV-5 were kneaded into the master batch obtained by an open roll to obtain a rubber composition. The unvulcanized physical properties and the vulcanized physical properties of the obtained rubber composition were measured. The resultant compositions are shown in Table IV-5.

Preparation of Test Pieces

The obtained rubber compositions were press vulcanized in predetermined molds at 150° C. for 45 minutes to prepare the desired test pieces.

TABLE II-3

|  | Comp. Ex. II-21 | Comp. Ex. II-22 | Comp. Ex. II-23 | Ex. II-15 | Ex. II-16 | Ex. II-17 |
|---|---|---|---|---|---|---|
| IR/BR base master batch | MB1 | MB2 | MB3 | MB1 | MB2 | MB3 |
| Powdered sulfur | 1.3 | 1.5 | 1.5 | 0.9 | 0.9 | 0.9 |
| Vulcanization accelerator 2 (TBBS) | 1.0 | 1.0 | 1.0 | 1.0 | 1.0 | 1.0 |
| Polysulfide 1 (4 sulfur atoms, molecular weight 5500, end allyl) | — | — | — | 0.83 | 0.83 | 0.83 |
| Ratio of amount of polysulfide added/amount of sulfur added | — | — | — | 0.92 | 0.92 | 0.92 |
| Ratio by weight of (polysulfide + sulfur)/accelerator | — | — | — | 1.73 | 1.73 | 1.73 |
| VM (× $10^{-5}$ mol/cc) | 2.2 | 2.1 | 2.0 | 2.5 | 2.4 | 2.4 |
| VD (× $10^{-5}$ mol/cc) | 4.3 | 4.2 | 4.3 | 5.7 | 5.7 | 5.8 |
| VM + D (× $10^{-5}$ mol/cc) | 6.5 | 6.3 | 6.3 | 8.2 | 8.1 | 8.2 |
| VT (× $10^{-5}$ mol/cc) | 15.2 | 14.9 | 14.6 | 14.0 | 13.8 | 13.8 |
| VM/VT | 0.14 | 0.14 | 0.14 | 0.18 | 0.17 | 0.17 |
| VM/VD | 0.51 | 0.50 | 0.47 | 0.44 | 0.42 | 0.41 |
| (VT − VM + D)/VT | 0.57 | 0.58 | 0.57 | 0.42 | 0.41 | 0.41 |
| Vulcanization time $T_{95}$ (150° C.) (min) | 10.0 | 10.2 | 10.7 | 13.5 | 13.8 | 13.9 |
| tanδ (60° C.) (Not yet aged) | 0.124 | 0.115 | 0.103 | 0.138 | 0.129 | 0.118 |
| Stress at 100% elongation (MPa) | 2.7 | 2.4 | 2.3 | 2.7 | 2.4 | 2.3 |
| Elongation strength at break (MPa) | 30.1 | 29.8 | 28.3 | 28.6 | 28.5 | 27.9 |
| Elongation at break (%) | 497 | 489 | 479 | 598 | 581 | 573 |
| (Aged at 100° C. × 96 hr) |  |  |  |  |  |  |
| Stress at 100% elongation (MPa) | 3.8 | 3.4 | 3.3 | 3.5 | 3.2 | 3.1 |
| Elongation strength at break (MPa) | 19.6 | 18.8 | 17.0 | 21.5 | 21.1 | 20.1 |
| Elongation at break (%) | 298 | 279 | 254 | 449 | 424 | 418 |
| Rate of retention of elongation strength at break | 0.65 | 0.63 | 0.60 | 0.75 | 0.74 | 0.72 |
| Rate of preservation of elongation at break | 0.60 | 0.57 | 0.53 | 0.75 | 0.73 | 0.73 |

As explained above, according to the present invention, it is possible to suppress a decline in physical properties after heat aging without reducing the strength or elongation at break of the vulcanized rubber. Further, according to the present invention, it is possible to maintain the properties even after aging without reducing the repeated fatigue strength.and, further, possible to shorten the vulcanization time drastically compared with known polysulfide rubber formulations.

In addition, according to the present invention, it is possible to improve the reversion resistance without changing the strength or elongation at break, the vulcanization time, the heat buildup property, and other physical properties of the vulcanized rubber.

Furthermore, according to the present invention, by compounding a sulfur compound having a specific structure (I) or (II) to a diene rubber, it is possible to obtain a rubber composition improved in abrasion resistance, heat aging characteristics (ΔEB), and appearance after use (EB after aging) while securing the heat buildup property and cut resistance (Hs, EB) when new (BL).

What is claimed is:

1. A vulcanized rubber composition comprising (i) a vulcanizable rubber, (ii) a reinforcing filler, and (iii) a sulfur compound having the formula (I):

—(S$_x$R$^1$)$_n$—     (I)

wherein R$^1$ represents an organic group,
x is an average number of 3 to 5, and
n is an integer of 1 to 100, and (iv) at least one vulcanization accelerator selected from the group consisting of a thiazole base, sulfenamide base, thiuram base, and dithio acid salt base accelerators in an amount such that a ratio (iii)/(iv) by weight of the vulcanization accelerator (iv) and the polysulfide polymer (iii) is 0.3 to 4, wherein a ratio (VM/VD) is not more than 0.4, in which:

a value VM is obtained from the degree of change before and after toluene swelling of the vulcanized rubber composition treated in a lithium aluminum hydride saturated tetrahydrofuran/toluene (ratio by volume 1/1) mixed solution using the formula (A):

wherein $vr_M = \dfrac{1-\phi}{X_M - \phi}$ wherein $X_M$ is the degree of change before and after toluene swelling (volume after toluene swelling/volume before toluene swelling) after treatment in a lithium aluminum hydride saturated tetrahydrofuran/toluene (ratio by volume 1/1) mixed solution, φ is the volume percentage of the reinforcing filler in the rubber composition, V$_s$ is the molecular volume of toluene, μ is the rubber.toluene interaction coefficient, and vr$_M$ is the volume percentage of rubber in the swelled rubber after treatment in a lithium aluminum hydride saturated tetrahydrofuran/toluene (ratio by volume 1/1) mixed solution) and a value VD is obtained from the degree of change before and after toluene swelling of the vulcanized rubber composition treated in a propane-2-thiol (0.4 mol/1)/piperidine (0.4 mol/1) added tetrahydrofuran/toluene (ratio by volume 1/1)

mixed solution using the formula (B):

wherein $vr_{D+M} = \dfrac{1-\phi}{X_{D+M} - \phi}$ wherein $X_{D+M}$ is the degree of change before and after toluene swelling (volume after toluene swelling/volume before toluene swelling) after treatment in a propane-2-thiol (0.4 mol/1)/piperidine (0.4 mol/1) added tetrahydrofuran/toluene (ratio by volume 1/1) mixed solution and vr$_{D+M}$ is the volume percentage of rubber in the swelled rubber after treatment in a propane-2-thiol (0.4 mol/1)/piperidine (0.4 mol/1) added tetrahydrofuran/toluene (ratio by volume 1/1) mixed solution.

2. A vulcanized rubber composition as claimed in claim 1, wherein the ratio (VM/VT) is not more than 0.15, in which VT is obtained from the degree of change before and after toluene swelling of the untreated vulcanized rubber composition using formula (C):

wherein $vr_T = \dfrac{1-\phi}{X_T - \phi}$ wherein $X_T$ is the degree of change before and after toluene swelling when untreated (volume after toluene swelling/volume before toluene swelling) and vr$_T$ is the volume percentage of rubber in the swelled rubber when untreated.

3. A rubber composition as claimed in claim 1, wherein the Mooney viscosity of the material of the sulfur compound is not more than 100.

4. A vulcanized rubber composition as claimed in claim 1, wherein the sulfur compound is a polysulfide polymer having a number average molecular weight of 200 to 15000.

5. A vulcanized rubber composition as claimed in claim 1, wherein the sulfur compound is a polysulfide polymer having the formula (III) to which sulfur is added in the backbone and having y of 3 to 5 on average and z of 3 to 5 on average:

R$^3$S$_z$R$^2$(S$_y$R$^2$)$_m$S$_z$R$^3$     (III)

wherein R$^2$ is a C$_2$ to C$_{10}$ oxyalkylene group and/or C$_2$ to C$_{10}$ and O$_2$ to O$_{10}$ polyoxyalkylene group, R$^3$ is at least one functional group selected from the group consisting of a C$_1$ to C$_{30}$ hydrocarbon group, y is a number of 1.0 to 6.0, z is a number of 1.0 to 6.0, and m is an integer of 1 to 50.

6. A rubber composition comprising (i) 100 parts by weight of a vulcanizable rubber, (ii) a reinforcing filler, (iii) a sulfur compound (1) having the formula (I):

—(S$_x$R$^1$)$_n$—     (I)

wherein R$^1$ represents an organic group,
x is an average number of 3 to 5, and
n is an integer of 1 to 100, (iv) sulfur (2) in a ratio (1)/(2) of the sulfur compound (1) and the sulfur (2) of less than 0.5 and in a total weight of (1)+(2) of not more than 20 parts by weight, and (v) at least one vulcanization accelerator selected from the group consisting of a thiazole base, sulfenamide base, thiuram base, and dithio acid salt base accelerators in an amount such that a ratio (iii)/(v) by weight of the vulcanization accelerator (v) and the polysulfide polymer (iii) is 0.3 to 4, wherein a ratio (VM/ND) is not more than 0.4, in which:

a value VM is obtained from the degree of change before and after toluene swelling of the vulcanized rubber composition treated in a lithium aluminum hydride saturated tetrahydrofuran/toluene (ratio by volume 1/1) mixed solution using the formula (A):

$$VM = -\frac{1}{VS} \cdot \left[ \frac{\ln(1 - vr_M) + vr_M + \mu \cdot vr_M^2}{vr_M^{1/3} - vr_M/2} \right] \quad (A)$$

wherein $vr_M = \frac{1 - \phi}{X_M - \phi}$ wherein $X_M$ is the degree of change before and after toluene swelling (volume after toluene swelling/volume before toluene swelling) after treatment in a lithium aluminum hydride saturated tetrahydrofuran/toluene (ratio by volume 1/1) mixed solution, φ is the volume percentage of the reinforcing filler in the rubber composition, $V_s$ is the molecular volume of toluene, μ is the rubber.toluene interaction coefficient, and $vr_M$ is the volume percentage of rubber in the swelled rubber after treatment in a lithium aluminum hydride saturated tetrahydrofuran/toluene (ratio by volume 1/1) mixed solution) and a value VD is obtained from the degree of change before and after toluene swelling of the vulcanized rubber composition treated in a propane-2-thiol (0.4 mol/1)/piperidine (0.4 mol/1) added tetrahydrofuran/toluene (ratio by volume 1/1) mixed solution using the formula (B):

$$VD = -\frac{1}{VS} \cdot \left[ \frac{\ln(1 - vr_{D+M}) + vr_{D+M} + \mu \cdot vr_{D+M}^2}{vr_{D+M}^{1/3} - vr_{D+M}/2} - \frac{\ln(1 - vr_M) + vr_M + \mu \cdot vr_M^2}{vr_M^{1/3} - vr_M/2} \right] \quad (B)$$

wherein $vr_{D+M} = \frac{1 - \phi}{X_{D+M} - \phi}$ wherein $X_{D+M}$ is the degree of change before and after toluene swelling (volume after toluene swelling/volume before toluene swelling) after treatment in a propane-2-thiol (0.4 mol/1)/piperidine (0.4 mol/1) added tetrahydrofuran/toluene (ratio by volume 1/1) mixed solution and $vr_{D+M}$ is the volume percentage of rubber in the swelled rubber after treatment in a propane-2-thiol (0.4 mol/1)/piperidine (0.4 mol/1) added tetrahydrofuran/toluene (ratio by volume 1/1) mixed solution.

7. A rubber composition as claimed in claim 6, wherein the Mooney viscosity of the starting sulfur compound is not more than 100.

8. A rubber composition as claimed in claim 6, wherein the sulfur compound is a polysulfide polymer having a number average molecular weight of 200 to 15000.

9. A rubber composition as claimed in claim 6, wherein the sulfur compound is a polysulfide polymer having the formula (III) to which sulfur is added in the backbone and having y of 3 to 5 on average and z of 3 to 5 on average:

$$R^3S_zR^2(S_yR^2)_mS_zR^3 \quad (III)$$

wherein $R^2$ is a $C_2$ to $C_{10}$ oxyalkylene group and/or $C_2$ to $C_{10}$ and $O_2$ to $O_{10}$ polyoxyalkylene group, $R^3$ is at least one type of functional group selected from the group consisting of a $C_1$ to $C_{30}$ hydrocarbon group, y is a number of 1.0 to 6.0, z is a number of 1 to 6, and m is an integer of 1 to 50.

10. A vulcanized rubber composition as claimed in claim 5 wherein $R^2$ of the formula III has the following formula (IV):

$$—C_2H_4OC_{m'}H_{2m'}OC_2H_4— \quad (IV)$$

wherein m' is an integer of 1 to 2.

11. A vulcanized rubber composition as claimed in claim 9 wherein $R^2$ of the formula III had the following formula (IV):

$$—C_2H_4OC_{m'}H_{2m'}OC_2H_4— \quad (IV)$$

wherein m' is an integer of 1 to 2.

* * * * *